United States Patent
Gellaboina et al.

(10) Patent No.: US 10,913,905 B2
(45) Date of Patent: Feb. 9, 2021

(54) CATALYST CYCLE LENGTH PREDICTION USING EIGEN ANALYSIS

(71) Applicant: UOP LLC, Des Plaines, IL (US)

(72) Inventors: Mahesh Kumar Gellaboina, Kurnool (IN); Michael Terry, Chicago, IL (US); Seth Huber, Des Plaines, IL (US); Danielle Schindlbeck, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 313 days.

(21) Appl. No.: 16/011,614

(22) Filed: Jun. 18, 2018

(65) Prior Publication Data

US 2018/0362862 A1  Dec. 20, 2018

Related U.S. Application Data

(60) Provisional application No. 62/522,043, filed on Jun. 19, 2017.

(51) Int. Cl.
| | | |
|---|---|---|
| *C10G 47/36* | (2006.01) | |
| *C10G 11/00* | (2006.01) | |
| *G05B 13/04* | (2006.01) | |

(52) U.S. Cl.
CPC .............. *C10G 47/36* (2013.01); *C10G 11/00* (2013.01); *G05B 13/042* (2013.01)

(58) Field of Classification Search
CPC ....... C10G 47/36; C10G 11/00; G05B 13/042
See application file for complete search history.

(56) References Cited

U.S. PATENT DOCUMENTS

| | | | |
|---|---|---|---|
| 4,159,239 A | 6/1979 | Schwartz | 208/113 |
| 4,267,458 A | 5/1981 | Uram | 290/40 R |
| 4,284,494 A | 8/1981 | Bartholic | 208/164 |
| 4,362,614 A | 12/1982 | Asdigian | 208/235 |
| 4,380,146 A | 4/1983 | Yannone | 60/39.281 |

(Continued)

FOREIGN PATENT DOCUMENTS

| | | | | |
|---|---|---|---|---|
| EP | 0181744 A1 | 5/1986 | | B65G 53/66 |
| EP | 2746884 A1 | 6/2014 | | G05B 23/02 |

(Continued)

OTHER PUBLICATIONS

WO App. No. PCT/US2018/038299: International Preliminary Report on Patentability (Dec. 24, 2019)—6 pages.

(Continued)

*Primary Examiner* — Shogo Sasaki

(57) ABSTRACT

Systems and methods are disclosed for managing the operation of a plant, such as a chemical plant or a petrochemical plant or a refinery, and more particularly for enhancing system performance of a catalyzed reaction system by, among other features, detecting catalyst deactivation and cycle length. Plants may include those that provide hydrocarbon cracking or other process units. A plant may include a reactor, a heater, a catalyst bed, a separator, and other equipment. The equipment may use catalyst to treat feed products to remove compounds and produce different products. Catalysts used in the various reactors in these processes become deactivated over time. Systems and methods are disclosed for extending catalyst life and thereby improving efficiency of the plant.

20 Claims, 17 Drawing Sheets

(56) References Cited

U.S. PATENT DOCUMENTS

| | | | |
|---|---|---|---|
| 4,385,985 A | 5/1983 | Gross | 208/113 |
| 4,411,773 A | 10/1983 | Gross | 208/159 |
| 4,709,546 A | 12/1987 | Weiler | 415/116 |
| 4,775,460 A | 10/1988 | Reno | |
| 4,795,545 A | 1/1989 | Schmidt | |
| 4,902,469 A | 2/1990 | Watson | 376/216 |
| 5,077,252 A | 12/1991 | Owen et al. | 502/43 |
| 5,227,121 A | 7/1993 | Scarola | 340/525 |
| 5,582,684 A | 12/1996 | Holmqvist et al. | 162/49 |
| 5,605,435 A | 2/1997 | Haugen | 137/514 |
| 5,616,214 A | 4/1997 | Leclerc | 162/49 |
| 5,642,296 A | 6/1997 | Saxena | 216/84 |
| 5,666,297 A | 9/1997 | Britt et al. | 364/578 |
| 5,817,517 A | 10/1998 | Perry et al. | 436/55 |
| 6,038,540 A | 3/2000 | Krist et al. | 705/8 |
| 6,081,230 A | 6/2000 | Hoshino | 342/357.32 |
| 6,230,486 B1 | 5/2001 | Yasui | 123/674 |
| 6,266,605 B1 | 7/2001 | Yasui | 60/276 |
| 6,271,845 B1 | 8/2001 | Richardson | 715/764 |
| 6,392,114 B1 | 5/2002 | Shields et al. | 582/719 |
| 6,760,716 B1 | 7/2004 | Ganesamoorthi et al. | 706/21 |
| 6,772,044 B1 | 8/2004 | Mathur et al. | 700/204 |
| 6,795,798 B2 | 9/2004 | Eryurek et al. | 702/188 |
| 6,982,032 B2 | 1/2006 | Shaffer et al. | 210/101 |
| 6,983,227 B1 | 1/2006 | Thalhammer-Reyero | |
| 7,006,889 B2 | 2/2006 | Mathur et al. | 700/204 |
| 7,067,333 B1 | 6/2006 | Pasadyn et al. | 438/5 |
| 7,133,807 B2 | 11/2006 | Karasawa | 702/188 |
| 7,151,966 B1 | 12/2006 | Baier et al. | 700/19 |
| 7,246,039 B2 | 7/2007 | Moorhouse | 702/185 |
| 7,313,447 B2 | 12/2007 | Hsuing et al. | 700/9 |
| 7,415,357 B1 | 8/2008 | Stluka et al. | 702/6 |
| 7,567,887 B2 | 7/2009 | Emigholz et al. | 702/182 |
| 7,742,833 B1 | 6/2010 | Herbst et al. | 700/108 |
| 7,836,941 B2 | 11/2010 | Song et al. | |
| 7,877,596 B2 | 1/2011 | Foo Kune et al. | 713/153 |
| 7,925,979 B2 | 4/2011 | Forney et al. | 715/733 |
| 7,936,878 B2 | 5/2011 | Kune et al. | 380/270 |
| 7,979,192 B2 | 7/2011 | Morrison et al. | |
| 7,995,526 B2 | 8/2011 | Liu et al. | 370/329 |
| 8,050,889 B2 | 11/2011 | Fluegge et al. | 702/182 |
| 8,055,371 B2 | 11/2011 | Sanford et al. | 700/108 |
| 8,111,619 B2 | 2/2012 | Liu et al. | 370/229 |
| 8,128,808 B2 | 3/2012 | Hassan et al. | 208/209 |
| 8,204,717 B2 | 6/2012 | McLaughlin et al. | 702/184 |
| 8,244,384 B2 | 8/2012 | Pachner et al. | 700/30 |
| 8,280,057 B2 | 10/2012 | Budampati et al. | 380/270 |
| 8,352,049 B2 | 1/2013 | Hsiung et al. | |
| 8,354,081 B2 | 1/2013 | Wheat et al. | |
| 8,385,436 B2 | 2/2013 | Holm et al. | 375/260 |
| 8,428,067 B2 | 4/2013 | Budampati et al. | 370/395.21 |
| 8,458,778 B2 | 6/2013 | Budampati et al. | 726/6 |
| 8,571,064 B2 | 10/2013 | Kore et al. | 370/469 |
| 8,630,962 B2 | 1/2014 | Maeda | 706/12 |
| 8,644,192 B2 | 2/2014 | Budampati et al. | 370/255 |
| 8,811,231 B2 | 8/2014 | Budampati et al. | 370/255 |
| 8,815,152 B2 | 8/2014 | Burgess et al. | |
| 8,923,882 B2 | 12/2014 | Gandhi et al. | 455/455 |
| 8,926,737 B2 | 1/2015 | Chatterjee et al. | |
| 9,053,260 B2 | 6/2015 | Romatier et al. | |
| 9,134,717 B2 | 9/2015 | Trnka | |
| 9,166,667 B2 | 10/2015 | Thanikachalam | |
| 9,176,498 B2 | 11/2015 | Baramov | |
| 9,354,631 B2 | 5/2016 | Mohideen et al. | |
| 9,571,919 B2 | 2/2017 | Zhang et al. | |
| 9,580,341 B1 | 2/2017 | Brown et al. | C02F 3/006 |
| 9,751,817 B2 | 9/2017 | Jani et al. | |
| 9,864,823 B2 | 1/2018 | Horn et al. | |
| 9,968,899 B1 | 5/2018 | Gellaboina et al. | |
| 10,095,200 B2 | 10/2018 | Horn et al. | |
| 10,107,295 B1 | 10/2018 | Brecheisen | |
| 10,180,680 B2 | 1/2019 | Horn et al. | |
| 10,183,266 B2 | 1/2019 | Victor et al. | |
| 10,222,787 B2 | 3/2019 | Romatier et al. | |
| 10,328,408 B2 | 6/2019 | Victor et al. | |
| 2002/0123864 A1 | 9/2002 | Eryurek et al. | 702/188 |
| 2002/0179495 A1 | 12/2002 | Heyse et al. | 208/137 |
| 2003/0036052 A1 | 2/2003 | Delwiche et al. | 435/4 |
| 2003/0105775 A1 | 6/2003 | Shimada | |
| 2003/0147351 A1 | 8/2003 | Greenlee | 370/232 |
| 2003/0223918 A1 | 12/2003 | Cammy | 422/144 |
| 2004/0079392 A1 | 4/2004 | Kuechler | 134/22.19 |
| 2004/0099572 A1 | 5/2004 | Evans | 208/113 |
| 2004/0109788 A1 | 6/2004 | Li et al. | 422/3 |
| 2004/0122273 A1 | 6/2004 | Kabin | 585/639 |
| 2004/0122936 A1 | 6/2004 | Mizelle et al. | |
| 2004/0147036 A1 | 7/2004 | Krenn et al. | 436/119 |
| 2004/0148144 A1 | 7/2004 | Martin | |
| 2004/0204775 A1 | 10/2004 | Keyes | 705/30 |
| 2004/0204913 A1 | 10/2004 | Mueller et al. | |
| 2004/0220689 A1 | 11/2004 | Mathur et al. | 700/97 |
| 2004/0220778 A1 | 11/2004 | Imai et al. | 702/188 |
| 2005/0027721 A1 | 2/2005 | Saenz | 707/100 |
| 2005/0029163 A1 | 2/2005 | Letzsch | 208/113 |
| 2005/0098033 A1 | 5/2005 | Mallavarapu et al. | 95/96 |
| 2005/0133211 A1 | 6/2005 | Osborn et al. | |
| 2005/0216209 A1 | 9/2005 | Evans | 702/45 |
| 2006/0020423 A1 | 1/2006 | Sharpe, Jr. | 702/183 |
| 2006/0133412 A1 | 6/2006 | Callaghan | 370/465 |
| 2006/0252642 A1 | 11/2006 | Kanazirev | |
| 2006/0259163 A1 | 11/2006 | Hsiung et al. | 700/30 |
| 2007/0020154 A1 | 1/2007 | Evans | 422/139 |
| 2007/0059159 A1 | 3/2007 | Hjerpe | 415/117 |
| 2007/0059838 A1 | 3/2007 | Morrison et al. | 436/55 |
| 2007/0091824 A1 | 4/2007 | Budampati et al. | 370/255 |
| 2007/0091825 A1 | 4/2007 | Budampati et al. | 370/255 |
| 2007/0185664 A1 | 8/2007 | Tanaka | 702/56 |
| 2007/0192078 A1 | 8/2007 | Nasle et al. | 703/14 |
| 2007/0212790 A1 | 9/2007 | Welch et al. | 436/139 |
| 2007/0250292 A1 | 10/2007 | Alagappan et al. | 702/184 |
| 2007/0260656 A1 | 11/2007 | Wiig | |
| 2007/0271452 A1 | 11/2007 | Foo Kune et al. | 713/150 |
| 2007/0282019 A1* | 12/2007 | Fujimoto | C10L 3/12 518/715 |
| 2007/0293709 A1* | 12/2007 | Iaccino | C07C 2/76 585/312 |
| 2008/0086322 A1 | 4/2008 | Wallace | 705/1 |
| 2008/0130902 A1 | 6/2008 | Foo Kune et al. | 380/286 |
| 2008/0154434 A1 | 6/2008 | Galloway et al. | |
| 2008/0217005 A1 | 9/2008 | Stluka et al. | 166/250.01 |
| 2008/0282606 A1 | 11/2008 | Plaza et al. | |
| 2009/0059786 A1 | 3/2009 | Budampati et al. | 370/230 |
| 2009/0060192 A1 | 3/2009 | Budampati et al. | 380/270 |
| 2009/0064295 A1 | 3/2009 | Budampati et al. | 726/6 |
| 2009/0201899 A1 | 8/2009 | Liu et al. | 370/338 |
| 2009/0204245 A1 | 8/2009 | Sustaeta | 700/99 |
| 2009/0245286 A1 | 10/2009 | Kore et al. | 370/475 |
| 2009/0268674 A1 | 10/2009 | Liu et al. | 370/329 |
| 2009/0281677 A1 | 11/2009 | Botich | 700/295 |
| 2010/0014599 A1 | 1/2010 | Holm et al. | 375/260 |
| 2010/0108567 A1 | 5/2010 | Medoff | 208/49 |
| 2010/0125347 A1 | 5/2010 | Martin et al. | 700/31 |
| 2010/0152900 A1 | 6/2010 | Gurciullo et al. | |
| 2010/0158764 A1 | 6/2010 | Hedrick | 422/134 |
| 2010/0230324 A1 | 9/2010 | Al-Alloush et al. | 208/82 |
| 2010/0240777 A1* | 9/2010 | Fujimoto | B01J 37/06 518/700 |
| 2010/0262900 A1 | 10/2010 | Romatier et al. | 715/219 |
| 2011/0112659 A1 | 5/2011 | Pachner et al. | 700/29 |
| 2011/0152590 A1 | 6/2011 | Sadler et al. | 585/313 |
| 2011/0152591 A1 | 6/2011 | Sadler et al. | 585/313 |
| 2011/0311014 A1 | 12/2011 | Hottovy et al. | 376/283 |
| 2012/0029966 A1 | 2/2012 | Cheewakriengkrai et al. | 705/7.25 |
| 2012/0083933 A1 | 4/2012 | Subbu et al. | 700/291 |
| 2012/0095808 A1 | 4/2012 | Kattapuram et al. | 705/7.37 |
| 2012/0104295 A1 | 5/2012 | Do et al. | 251/129.01 |
| 2012/0121376 A1 | 5/2012 | Huis in Het Veld | 415/1 |
| 2012/0123583 A1 | 5/2012 | Hazen et al. | |
| 2012/0197616 A1 | 8/2012 | Trnka | 703/6 |
| 2012/0259583 A1 | 10/2012 | Noboa et al. | |
| 2013/0029587 A1 | 1/2013 | Gandhi et al. | 455/7 |
| 2013/0031960 A1 | 2/2013 | Delrahim et al. | 73/40.5 R |
| 2013/0079899 A1 | 3/2013 | Baramov | 700/32 |

(56) References Cited

U.S. PATENT DOCUMENTS

| | | | |
|---|---|---|---|
| 2013/0090088 A1 | 4/2013 | Chevsky et al. | 455/411 |
| 2013/0094422 A1 | 4/2013 | Thanikachalam | 370/312 |
| 2013/0172643 A1 | 7/2013 | Pradeep | 585/310 |
| 2013/0253898 A1 | 9/2013 | Meagher et al. | 703/18 |
| 2013/0270157 A1 | 10/2013 | Ferrara | 208/48 AA |
| 2013/0311437 A1 | 11/2013 | Stluka et al. | 707/706 |
| 2013/0327052 A1 | 12/2013 | O'Neill | 60/772 |
| 2014/0008035 A1 | 1/2014 | Patankar et al. | |
| 2014/0026598 A1 | 1/2014 | Trawicki | 62/56 |
| 2014/0074273 A1 | 3/2014 | Mohideen et al. | 700/98 |
| 2014/0114039 A1 | 4/2014 | Benham et al. | 526/348.5 |
| 2014/0131027 A1 | 5/2014 | Chir | 165/300 |
| 2014/0163275 A1 | 6/2014 | Yanagawa et al. | 585/319 |
| 2014/0179968 A1 | 6/2014 | Yanagawa et al. | 585/476 |
| 2014/0212978 A1 | 7/2014 | Sharpe, Jr. et al. | 436/6 |
| 2014/0294683 A1 | 10/2014 | Siedler | 422/129 |
| 2014/0294684 A1 | 10/2014 | Siedler | 422/129 |
| 2014/0296058 A1 | 10/2014 | Sechrist et al. | 502/53 |
| 2014/0309756 A1 | 10/2014 | Trygstad | 700/31 |
| 2014/0337256 A1 | 11/2014 | Varadi et al. | 706/12 |
| 2014/0337277 A1 | 11/2014 | Asenjo et al. | |
| 2015/0059714 A1 | 3/2015 | Bernards | 123/568.11 |
| 2015/0060331 A1 | 3/2015 | Sechrist et al. | |
| 2015/0077263 A1 | 3/2015 | Ali et al. | 340/679 |
| 2015/0078970 A1 | 3/2015 | Iddir et al. | 422/218 |
| 2015/0098862 A1 | 4/2015 | Lok et al. | 422/49 |
| 2015/0158789 A1 | 6/2015 | Keusenkothen | |
| 2015/0185716 A1 | 7/2015 | Wichmann et al. | 700/287 |
| 2015/0276208 A1 | 10/2015 | Maturana et al. | 700/274 |
| 2015/0284641 A1 | 10/2015 | Shi | 208/113 |
| 2015/0330571 A1 | 11/2015 | Beuneken | 141/4 |
| 2016/0033941 A1 | 2/2016 | T et al. | 700/81 |
| 2016/0048119 A1 | 2/2016 | Wojsznis | 700/11 |
| 2016/0098037 A1 | 4/2016 | Zornio et al. | 700/20 |
| 2016/0098234 A1 | 4/2016 | Weaver | 358/1.15 |
| 2016/0122663 A1 | 5/2016 | Pintart et al. | |
| 2016/0147204 A1 | 5/2016 | Wichmann et al. | 700/287 |
| 2016/0237910 A1 | 8/2016 | Saito | |
| 2016/0260041 A1 | 9/2016 | Horn et al. | |
| 2016/0291584 A1 | 10/2016 | Horn et al. | |
| 2016/0292188 A1 | 10/2016 | Horn et al. | |
| 2016/0292325 A1 | 10/2016 | Horn et al. | |
| 2016/0313653 A1 | 10/2016 | Mink | |
| 2016/0363315 A1 | 12/2016 | Colannino et al. | |
| 2017/0009932 A1 | 1/2017 | Oh | |
| 2017/0058213 A1 | 3/2017 | Oprins | 585/303 |
| 2017/0082320 A1 | 3/2017 | Wang | |
| 2017/0107188 A1 | 4/2017 | Kawaguchi | |
| 2017/0284410 A1 | 10/2017 | Sharpe, Jr. | |
| 2017/0315543 A1 | 11/2017 | Horn et al. | |
| 2017/0323038 A1 | 11/2017 | Horn et al. | |
| 2017/0352899 A1 | 12/2017 | Asai | |
| 2018/0046155 A1 | 2/2018 | Horn et al. | |
| 2018/0081344 A1 | 3/2018 | Romatier et al. | |
| 2018/0082569 A1 | 3/2018 | Horn et al. | |
| 2018/0121581 A1 | 5/2018 | Horn et al. | |
| 2018/0122021 A1 | 5/2018 | Horn et al. | |
| 2018/0155638 A1 | 6/2018 | Al-Ghamdi | 208/79 |
| 2018/0155642 A1 | 6/2018 | Al-Ghamdi et al. | |
| 2018/0197350 A1 | 7/2018 | Kim | |
| 2018/0275690 A1 | 9/2018 | Lattanzio et al. | |
| 2018/0275691 A1 | 9/2018 | Lattanzio et al. | |
| 2018/0275692 A1 | 9/2018 | Lattanzio et al. | |
| 2018/0280914 A1 | 10/2018 | Victor et al. | |
| 2018/0280917 A1 | 10/2018 | Victor et al. | |
| 2018/0282633 A1 | 10/2018 | Van de Cotte et al. | |
| 2018/0282634 A1 | 10/2018 | Van de Cotte et al. | |
| 2018/0282635 A1 | 10/2018 | Van de Cotte et al. | |
| 2018/0283368 A1 | 10/2018 | Van de Cotte et al. | |
| 2018/0283392 A1 | 10/2018 | Van de Cotte et al. | |
| 2018/0283404 A1 | 10/2018 | Van de Cotte et al. | |
| 2018/0283811 A1 | 10/2018 | Victor et al. | |
| 2018/0283812 A1 | 10/2018 | Victor et al. | |
| 2018/0283813 A1 | 10/2018 | Victor et al. | |
| 2018/0283815 A1 | 10/2018 | Victor et al. | |
| 2018/0283816 A1 | 10/2018 | Victor et al. | |
| 2018/0283818 A1 | 10/2018 | Victor et al. | |
| 2018/0284705 A1 | 10/2018 | Van de Cotte et al. | |
| 2018/0286141 A1 | 10/2018 | Van de Cotte et al. | |
| 2018/0311609 A1 | 11/2018 | McCool et al. | |
| 2018/0362862 A1 | 12/2018 | Gellaboina et al. | |
| 2018/0363914 A1 | 12/2018 | Faiella et al. | |
| 2018/0364747 A1 | 12/2018 | Charr et al. | |
| 2019/0002318 A1 | 1/2019 | Thakkar et al. | |
| 2019/0003978 A1 | 1/2019 | Shi et al. | |
| 2019/0015806 A1 | 1/2019 | Gellaboina et al. | |
| 2019/0041813 A1 | 2/2019 | Horn et al. | |
| 2019/0083920 A1 | 3/2019 | Bjorklund et al. | |
| 2019/0101336 A1 | 4/2019 | Victor et al. | |
| 2019/0101342 A1 | 4/2019 | Victor et al. | |
| 2019/0101907 A1 | 4/2019 | Charr et al. | |
| 2019/0102966 A1 | 4/2019 | Lorenz | |
| 2019/0108454 A1 | 4/2019 | Banerjee et al. | |
| 2019/0120810 A1 | 4/2019 | Kumar KN et al. | |
| 2019/0151814 A1 | 5/2019 | Victor et al. | |
| 2019/0155259 A1 | 5/2019 | Romatier et al. | |

FOREIGN PATENT DOCUMENTS

| | | | | |
|---|---|---|---|---|
| EP | 2801937 A1 | 11/2014 | | G06Q 10/06 |
| GB | 1134439 A | 11/1968 | | G01N 31/22 |
| JP | 2008-031940 A | 2/2008 | | |
| WO | WO 1990/010083 A1 | 9/1990 | | C12Q 1/04 |
| WO | WO 2001/060951 A1 | 8/2001 | | C10G 51/04 |
| WO | WO 2006/044408 A1 | 4/2006 | | F23D 14/72 |
| WO | WO 2007/095585 A2 | 8/2007 | | A61K 31/721 |
| WO | WO 2009/046095 A1 | 4/2009 | | G06F 11/00 |
| WO | WO 2014/042508 A1 | 3/2014 | | G06Q 50/04 |
| WO | WO 2014/123993 A1 | 8/2014 | | G06F 17/00 |
| WO | WO 2016/141128 A1 | 9/2016 | | G06Q 10/06 |
| WO | WO 2017/079058 A1 | 5/2017 | | B01D 1/14 |

OTHER PUBLICATIONS

Notification Concerning Transmittal of International Preliminary Report on Patentability (Ch. 1 of PCT) (Jan. 2, 2020) 1 page.

Bespalov A. V. et al., Control systems of chemical and technological processes, pp. 508-509 (2001) (Russian).

Daniel Goebel, Dry Gas Seal Contamination During Operation and Pressurization Hold, [online], Feb. 2016, [retrieved on Jun. 19, 2019]. Retrieved from <https ://core.ac.uk/download/pdf/84815277. pdf> (Year: 2016).

EnergyMEDOR®, Product brochure (Nov. 2014).

Chistof Huber, Density and Concentration Measurement Application for Novel MEMS-based Micro Densitometer for Gas, [online], 2016, [retrieved on Jun. 19, 2019]. Retrieved from <https://www.ama-science.org/proceedings/getFile/ZwZ1 BD===> (Year: 2016).

Lotters, Real-time Composition Determination of Gas Mixtures, [online], 2015, [retrieved on Jun. 19, 2019]. Retrieved from <https://www .ama-science.org/proceedings/getFile/ZwNOZj===> (Year: 2015).

Maybeck, Peter S., "Stochastic models, estimation, and control," vol. 1, Academic Press (1979), 19 pages.

Sep. 27, 2018 (WO) International Search Report—App PCT/US2018/038299.

* cited by examiner

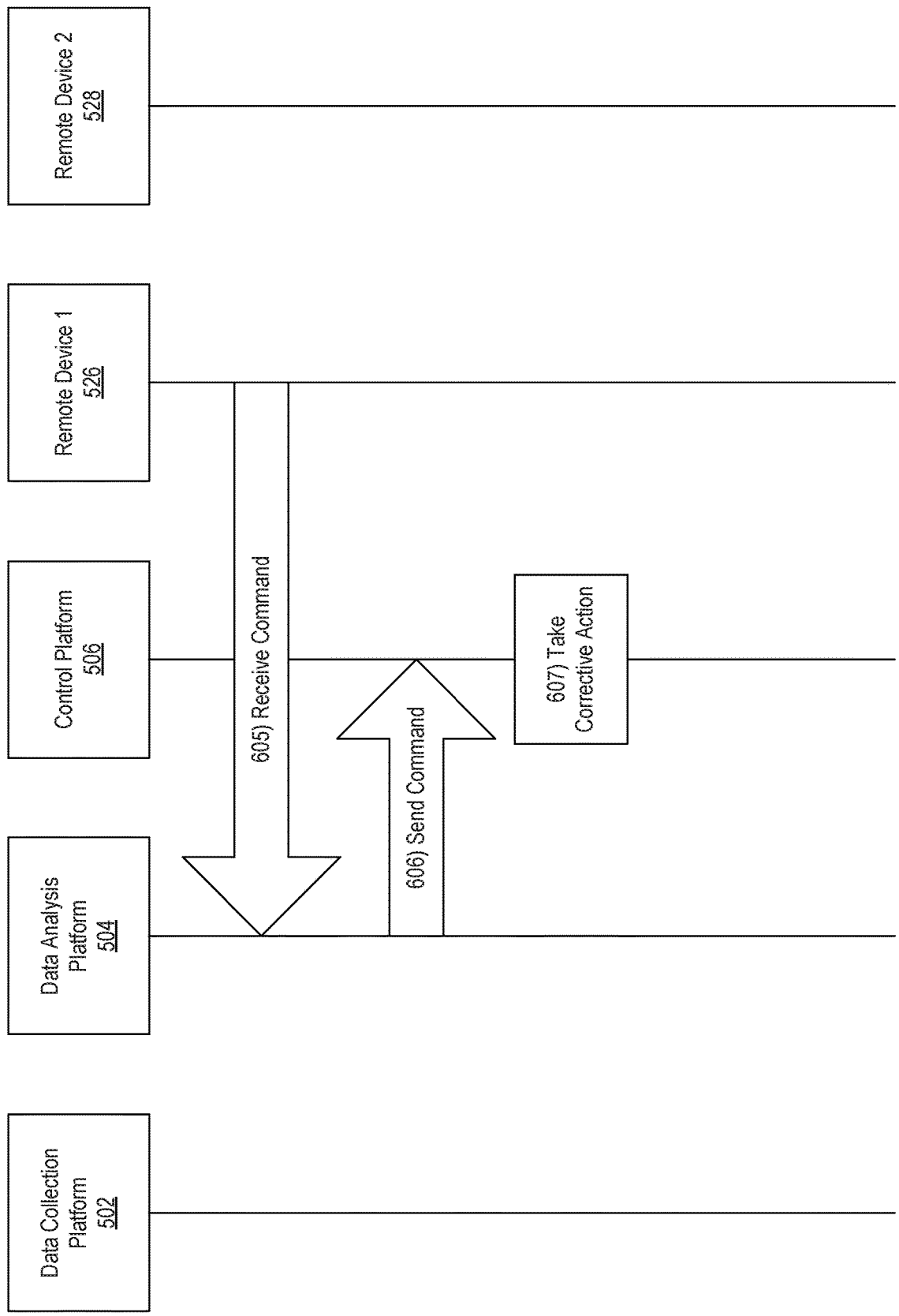

CATALYST CYCLE LENGTH PREDICTION USING EIGEN ANALYSIS

CROSS-REFERENCE TO RELATED APPLICATION

This application claims the benefit under 35 U.S.C. § 119(e) of U.S. Provisional Patent Application No. 62/522,043, filed Jun. 19, 2017, which is incorporated by reference herein.

TECHNICAL FIELD

The present disclosure is related to a method and system for managing the operation of a plant, such as a chemical plant or a petrochemical plant or a refinery, and more particularly to a method for enhancing system performance of a catalyzed reaction system by, inter alia, detecting catalyst deactivation and cycle length. Typical plants may be those that provide hydrocarbon cracking or other process units.

BACKGROUND

A plant or refinery may include hydrocarbon cracking or other process units, which may be subject to various problems. Equipment may break down over time, and need to be repaired or replaced. Catalyst may be used in a process, and catalyst may have limited life. Additionally, a process may be more or less efficient depending on one or more operating characteristics. There will always be a need for improving process efficiencies and improving equipment reliability.

SUMMARY

The following summary presents a simplified summary of certain features. The summary is not an extensive overview and is not intended to identify key or critical elements.

One or more embodiments may include a system including a plant, one or more sensors configured to measure operating information for the plant, a data collection platform, a data analysis platform, and/or a control platform. The plant may include a reactor, a compressor, a separator, and/or a catalyst bed. The data collection platform may include one or more processors of the data collection platform; a communication interface of the data collection platform and in communication with the one or more sensors; and non-transitory computer-readable memory storing executable instructions that, when executed, cause the data collection platform to: receive sensor data including the operating information for the plant; correlate the sensor data with time data; and transmit the sensor data. The data analysis platform may include one or more processors of the data analysis platform; non-transitory computer-readable memory storing executable instructions that, when executed, cause the data analysis platform to: receive the sensor data from the data collection platform; analyze the sensor data to determine an amount of reactant conversion taking place in the reactor of the plant; based on the amount of reactant conversion taking place in the reactor, determine an estimated catalyst life for catalyst being used in the reactor; determine an adjustment to an operating parameter of the plant based on the estimated catalyst life for the catalyst being used in the reactor; and transmit a command configured to cause the adjustment to the operating parameter of the plant. The control platform may include one or more processors of the control platform; non-transitory computer-readable memory storing executable instructions that, when executed, cause the control platform to: receive the command for the adjustment to the operating parameter of the plant; and adjust the operating parameter of the plant.

One or more embodiments may include non-transitory computer-readable media storing executable instructions that, when executed by at least one processor, cause a system to: receive sensor data for a plant including a reactor, a compressor, a separator, and a catalyst bed, the sensor data collected by one or more sensors configured to measure operating information for the plant; analyze the sensor data to determine an amount of reactant conversion taking place in the reactor of the plant; based on the amount of reactant conversion taking place in the reactor, determine an estimated catalyst life for catalyst being used in the reactor; determine an adjustment to an operating parameter of the plant based on the estimated catalyst life for the catalyst being used in the reactor; and transmit a command configured to cause the adjustment to the operating parameter of the plant.

One or more embodiments may include a method including receiving, by a computing device, sensor data for a plant including a reactor, a compressor, a separator, and a catalyst bed, the sensor data collected by one or more sensors configured to measure operating information for the plant; analyzing, by the computing device, the sensor data to determine an amount of reactant conversion taking place in the reactor of the plant; based on the amount of reactant conversion taking place in the reactor, determining, by the computing device, an estimated catalyst life for catalyst being used in the reactor; determining, by the computing device, an adjustment to an operating parameter of the plant based on the estimated catalyst life for the catalyst being used in the reactor; and transmitting, by the computing device, a command configured to cause the adjustment to the operating parameter of the plant.

Other technical features may be readily apparent to one skilled in the art from the following figures, descriptions, and claims.

BRIEF DESCRIPTION OF DRAWINGS

The present disclosure is illustrated by way of example and not limited in the accompanying figures in which like reference numerals indicate similar elements and in which:

FIGS. 6A-6B depict an illustrative flow diagram of one or more steps that one or more devices may perform in controlling one or more aspects of a plant operation in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

References herein to a "plant" or "system" are to be understood to refer to any of various types of chemical and petrochemical manufacturing or refining facilities. References herein to a plant "operators" are to be understood to refer to and/or include, without limitation, plant planners, managers, engineers, technicians, technical advisors, specialists (e.g., in instrumentation, pipe fitting, and welding), shift personnel, and others interested in, starting up, overseeing, monitoring operations of, and shutting down, the plant.

Petrochemical processes produce desirable products, such as jet fuel, kerosene, diesel fuel and other products known as middle distillates, as well as lower boiling hydrocarbon liquids, such as naphtha and gasoline. Heavy petroleum fractions are catalytically hydrocracked into lighter, more valuable products.

Feedstocks most often subjected to hydrocracking are the gas oils and heavy atmospheric and vacuum gas oils recovered from crude oil by distillation and catalytically or thermally cracked gas oils. These feedstocks are converted to lower molecular weight products. Simultaneously with the hydrocracking, sulfur, nitrogen, and oxygen compounds are almost completely removed and olefins are saturated, thereby giving products that are a mixture of essentially pure paraffins, naphthenes, and aromatics. The desired degree of hydrocracking takes place as the feed is processed over fixed beds of catalyst at elevated hydrogen pressure and temperature.

The process makes use of two types of reactions, hydrotreating and hydrocracking, to make clean, saturated, high value products. The hydrotreating reactions remove contaminants from the feed and product streams, while the hydrocracking reactions create usable lighter weight products. The primary hydrotreating reactions are sulfur and nitrogen removal as well as olefin saturation. The products of these reactions are the corresponding contaminant-free hydrocarbon, along with H2S and NH3. Other treating reactions include oxygen, metals and halide removal, and aromatic saturation. The reactions are typically carried out at elevated pressures and temperatures in a hydrogen atmosphere. The processes utilize catalysts to promote various reactions.

Figure 1:
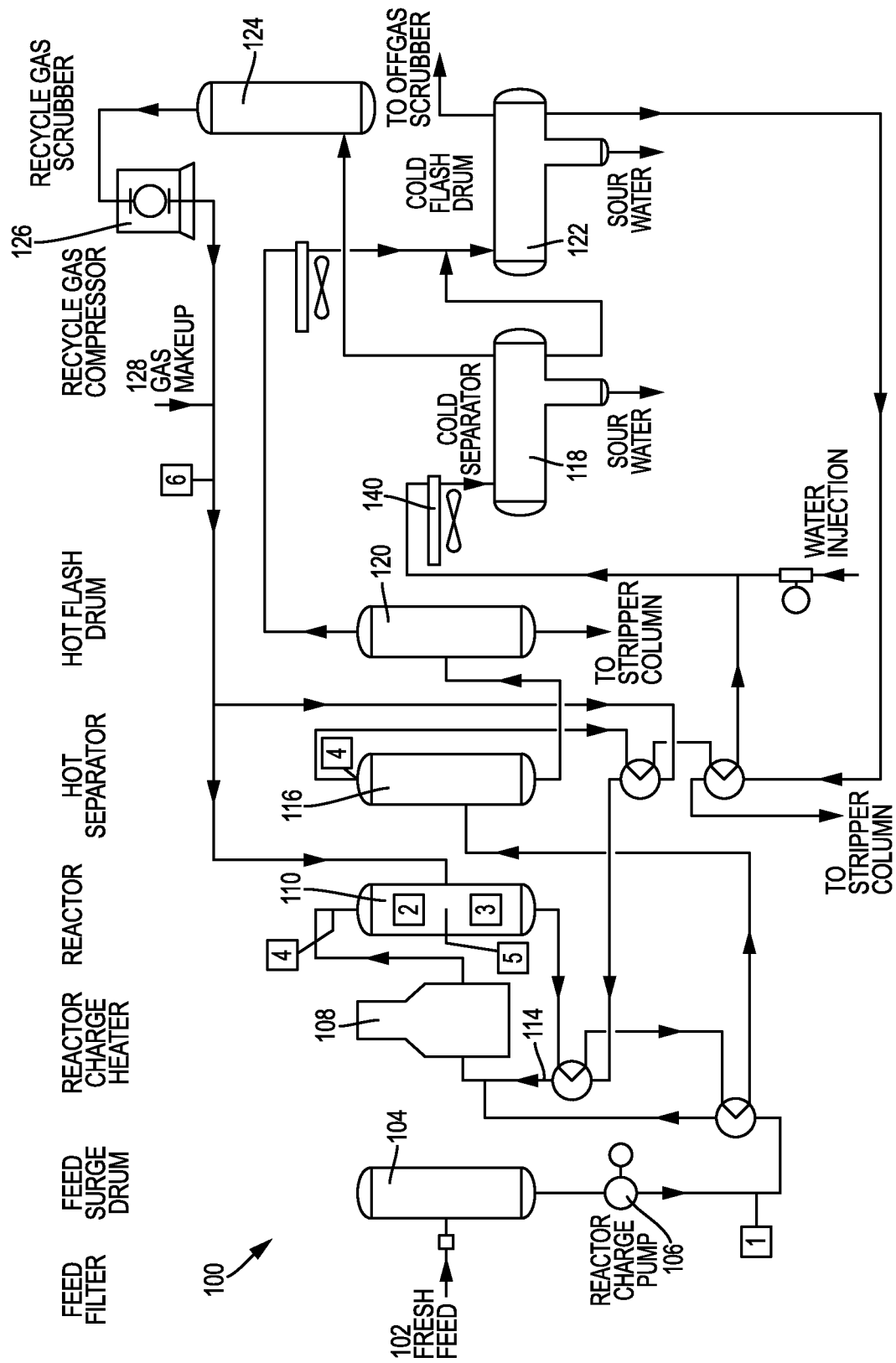
FIG. 1 depicts an illustrative arrangement for a single-stage catalytic hydrocracking process in accordance with one or more example embodiments.
Figure 2:
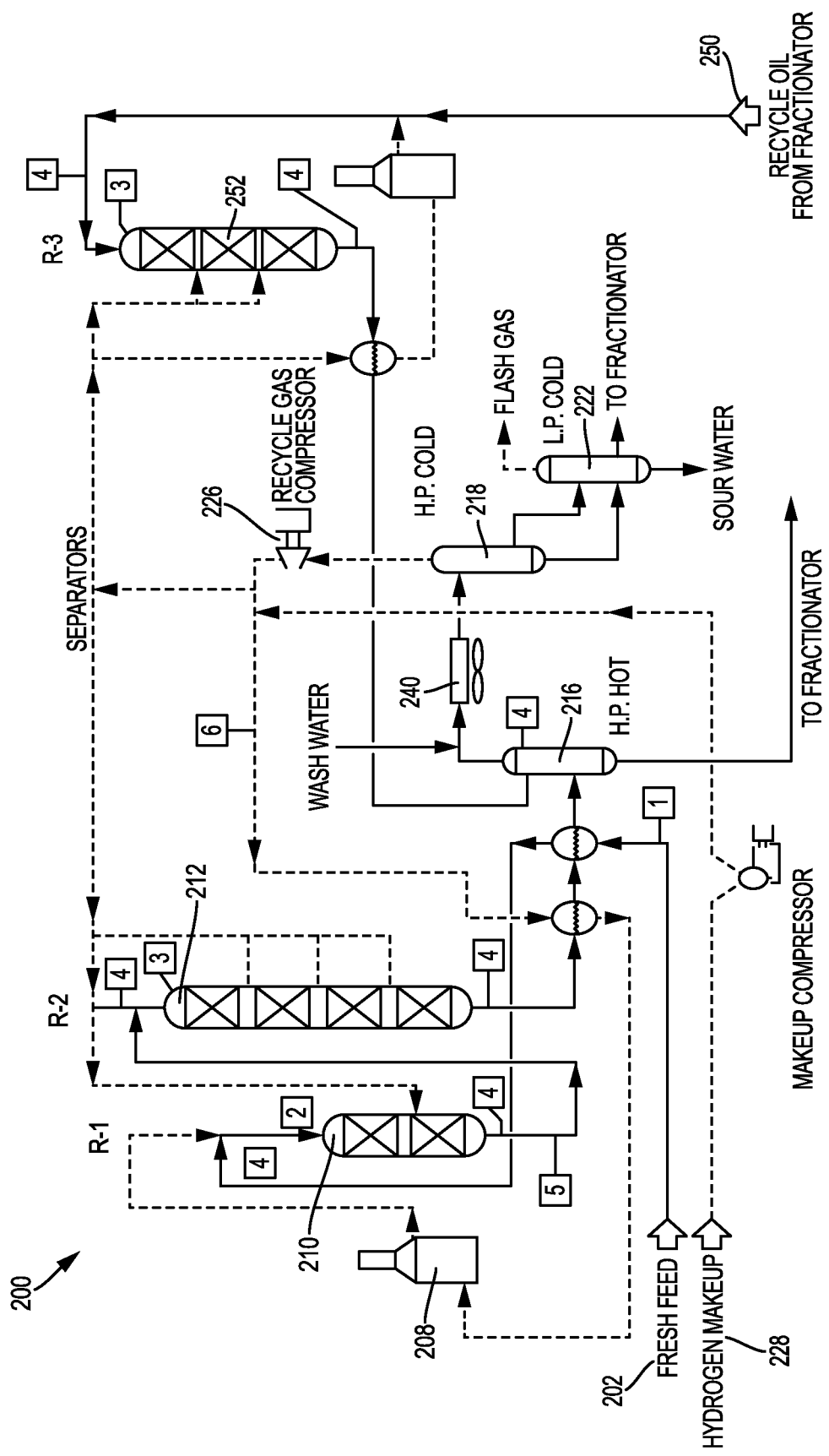
FIG. 2 depicts an illustrative arrangement for a two-stage catalytic hydrocracking process in accordance with one or more example embodiments.
Figure 3:
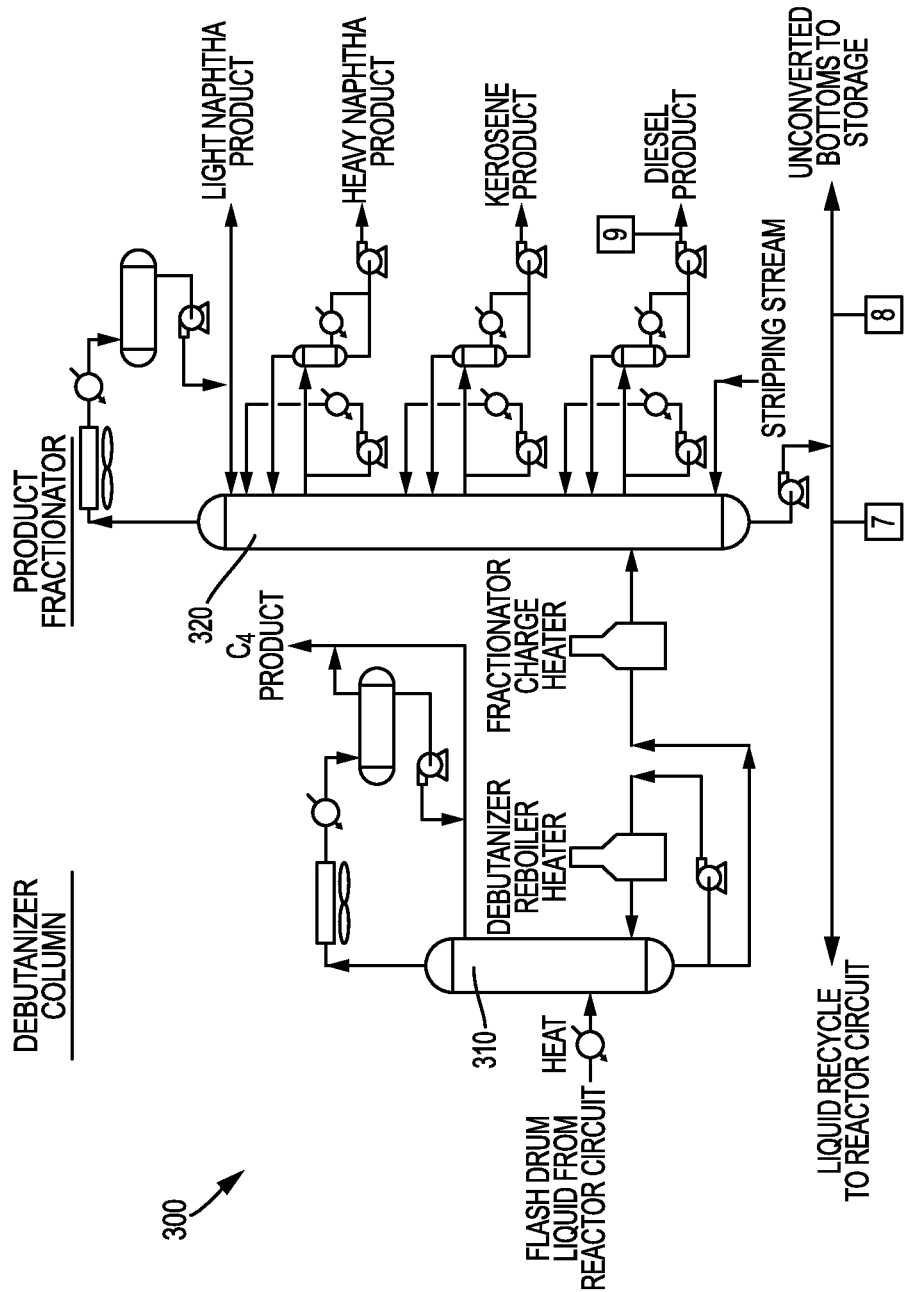
FIG. 3 depicts an illustrative arrangement of a fractionating section having a debutanizer first in accordance with one or more example embodiments.
Figure 4:
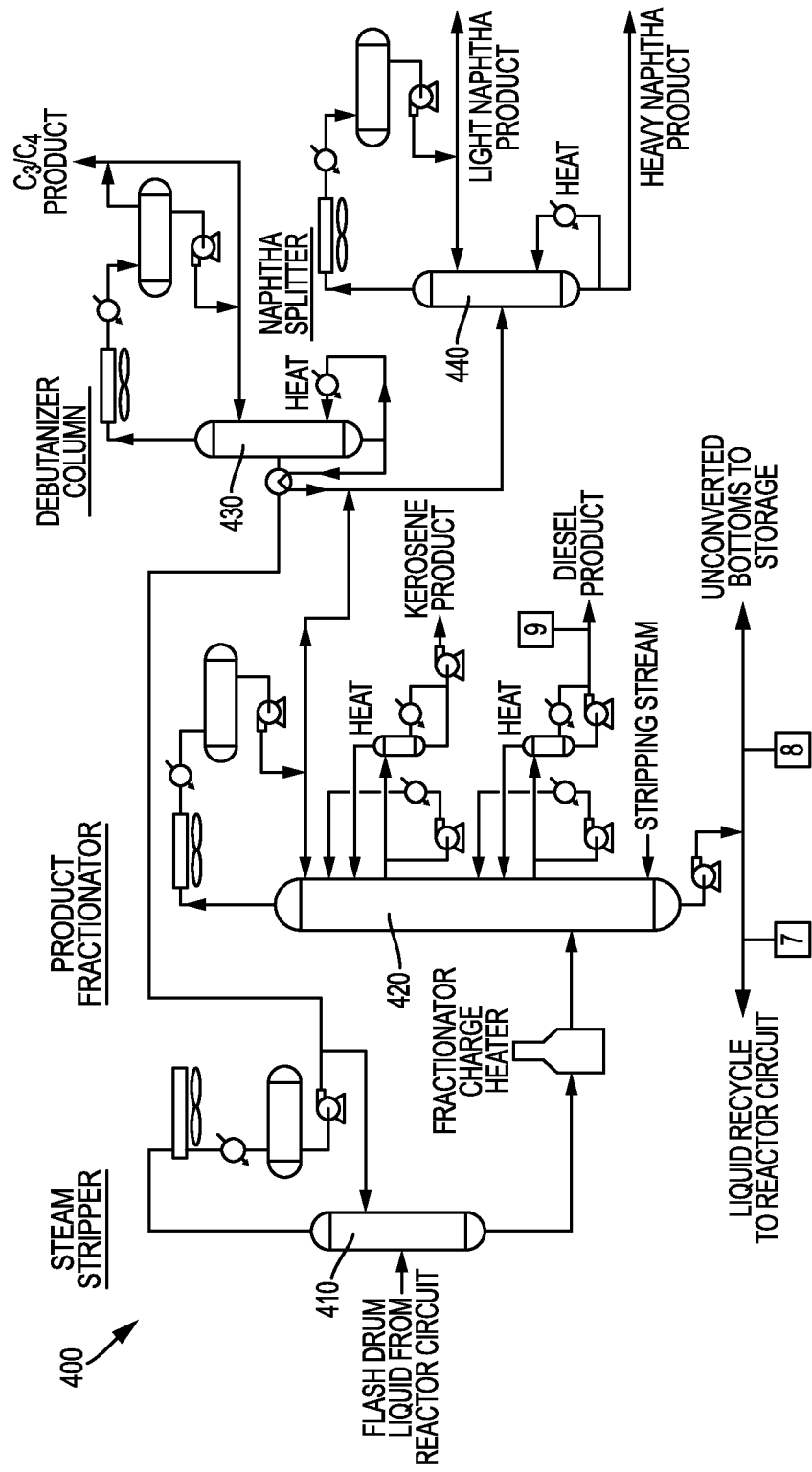
FIG. 4 depicts an illustrative arrangement of a fractionating section having a fractionator first in accordance with one or more example embodiments.

FIG. 1 depicts an exemplary single stage hydrocracking process and FIG. 2 depicts an exemplary two stage hydrocracking process. FIGS. 3 and 4 depict exemplary fractionating processes that each may be used subsequent to the processes depicted in FIGS. 1 and 2. The exemplary processes depicted in FIGS. 1-4 are simplified versions of such processes for illustrative purposes. Further process steps and equipment such as additional heaters, valves, and the like will be present in fully operating systems.

The catalytic reactors utilized in the exemplary processes each may be divided into individual catalyst beds supported on a beam and grid support system. The support system may be separated from the next bed of catalyst by a quench gas distributor, a reactant mixing chamber and a vapor/liquid distribution tray. The reactants flow downward through the catalyst beds.

FIG. 1 shows a typical arrangement for a single stage hydrotreating/hydrocracking system 100. Fresh feed (e.g., vacuum gas oil) 102 enters the system via feed surge drum 104. From the bottom of the surge drum the feed flows to the suction of the reactor charge pump. Hydrogen 114 may be added to the fresh feed stream prior to entering the heater 108. (Alternatively, the fresh feed may be combined with the hydrogen prior to the feed surge drum.)

The combined feed and hydrogen stream is exchanged with reactor effluent and further heated in a combined feed heater 108. (Alternatively, feed and recycle gas are heated separately by exchange with reactor effluent, for example. The recycle gas may be further heated in a recycle gas heater and then joins with the feed at the reactor inlet.)

After heating, the feedstock enters catalytic reactor 110. After exiting the reactor 110, the product stream is separated from the reaction byproducts and excess recycle gas. A typical high conversion recycle operation unit incorporates a hot separator 116. The hot separator design can include a bed of hydrotreating catalyst. By flowing through the hydrotreating catalyst, for example, naphtha kerosene and lighter liquid hydrocarbons are treated to remove mercaptan sulfur compounds.

The hot separator vapor is normally cooled by exchange with the recycle gas stream. It may also be cooled by exchange with the liquid feed stream. The vapor is then further cooled in an air cooler 140 before entering the cold separator 118. The liquid hydrocarbon and water are allowed to settle in the separator. The water is sent to sour-water treating facilities. The hydrocarbon liquid leaves the cold separator 118 and flows into the cold flash drum 122 where the liquid is depressured. As it flows across a level control valve, dissolved hydrogen, H2S, and light hydrocarbons are flashed off. Vapor is removed from the cold flash drum on pressure control. The hot separator liquid is routed to a hot flash drum 120 where dissolved hydrogen, H2S, and light hydrocarbon are flashed off. The flashed vapor from the hot flash drum is cooled via cooler 142 and then joins with the hydrocarbon liquid from the cold separator before entering the cold flash drum. Both hot and cold flash drum hydrocarbon liquids flow separately into the fractionation section.

After separation of the gas and liquid phases in the high pressure separator, the gas leaves from the top of the cold separator 118 and flows to the suction of the recycle gas compressor 126. In some cases the recycle gas will be first sent to an amine scrubber 124 to remove H2S. The recycle gas compressor 126 may be reciprocating or centrifugal.

After the recycle compressor discharge, some recycle gas will be split off the main stream for use as quench gas between catalyst beds of reactor 110. Separate quench gas streams are used to reduce reactor interbed temperatures before each catalyst bed. Quench flow is regulated by reactor bed inlet temperature, either by direct temperature control or by cascading through one or more quench gas flow controllers.

The bulk of the recycle gas is normally joined by the makeup gas 128. In some cases, the makeup gas joins the recycle gas before the recycle gas compressor.

The makeup gas 128 for the unit is a hydrogen-rich gas normally coming from a hydrogen plant. The makeup gas compressors will then compress the gas from supply pressure up to the reactor circuit pressure. From the discharge of the last stage of compression, the makeup gas typically joins the recycle gas at the discharge of the recycle gas compressor and flows to the reactors, as described above. As hydrogen is consumed in the reactors, the pressure in the high pressure separator will start to decrease. This will in turn call for more makeup gas.

FIG. 2 shows a typical arrangement for a two-stage hydrotreating/hydrocracking system 200. The two-stage system may utilize equipment and process steps similar to the single stage system described above. Fresh feed (e.g., vacuum gas oil) 202 enters the system and may be combined with hydrogen at some point before entering the heater 208. As with the process described above, the process may utilize a feed surge drum and charge pump. The combined feed and hydrogen stream may be heated as described above such as in feed heater 208.

After heating, the feedstock enters catalytic reactor 210 (typically for hydrotreatment) and subsequently catalytic reactor 212 (typically for hydrocracking.) After exiting the catalytic reactor 212, the product stream is separated from the reaction byproducts and excess recycle gas.

A typical high conversion recycle operation unit incorporates a hot high-pressure separator 216, an air cooler 240, and a high-pressure cold separator 218. Hydrocarbon liquid leaves the cold separator 218 and flows into the low-pressure cold separator 222. The separated hydrocarbons flow into the fractionation section.

Recycle oil from the fractionator may be hydrocracked in catalytic reactor 252. After exiting the catalytic reactor 252, the product stream is separated from the reaction byproducts and excess recycle gas.

After separation of the gas and liquid phases in the high pressure cold separator, the gas leaves from the top of the cold separator 218 and flows to the suction of the recycle gas compressor 226. After the recycle compressor discharge, some recycle gas will be split off the main stream for use as quench gas between catalyst beds of reactors 210 and 212 or reactor 252 and the bulk of the recycle gas is normally joined by the makeup gas 228, as discussed above for FIG. 1.

The feed to the fractionation section will contain everything from hydrogen and hydrogen sulfide through the heaviest components, and this stream will be separated into the desired products such as light gases, LPG, gasoline, kerosene, diesel oil, and unconverted oil from the fractionator column bottoms. The fractionator section may be, for example, a debutanizer first fractionating circuit as depicted in FIG. 3 or a fractionating circuit as depicted in FIG. 4.

FIG. 3 depicts a debutanizer column 310 to separate methane from a hydrocarbon product stream from the processes of FIGS. 1 and 2. The product stream then continues into fractionator 320 to separate the product stream into light naphtha products, heavy naphtha products, kerosene products, and diesel products.

FIG. 4 depicts a steam stripper 410 to separate an ethane/butane stream from a hydrocarbon product stream from the processes of FIGS. 1 and 2. The ethane/butane stream continues to debutanizer column 430 to separate ethane/butane. The hydrocarbon product streams continue into fractionator 420 to separate out kerosene products and diesel products. The hydrocarbon product stream then continues into naphtha splitter 440 to split light naphtha products from heavy naphtha products.

In each of the processes of FIGS. 3 and 4, a bottoms stream flows out of the bottom of the fractionator (320 or 420) and is separated into an unconverted bottoms stream that is stored and a liquid recycle that may be returned to the reactor circuit.

Problems Encountered

Catalysts used in the various reactors in these processes become deactivated over time, most commonly due to the deposition of metallized coke. Catalysts generally last two to four years, depending on the process feed and conditions. Replacing a catalyst bed is expensive and time consuming and requires the plant to be taken off-line. Typically the catalyst replacement is scheduled—but sometimes the catalyst becomes deactivated faster than anticipated and the scheduled replacement date is changed. Sometimes the catalyst does not become deactivated as fast as anticipated and actually has more catalytic life left. Thus a scheduled replacement date may be premature. It would be beneficial to determine/track remaining catalyst life in a catalyst bed to predict the end of catalyst cycle and allow planning of operational changes to reach target catalyst turnaround dates. For example, process parameters may be changed to increase or decrease catalyst deactivation so that the replacement date need not be changed.

There are three phases in catalyst deactivation process: super activity, linear catalyst aging, and rapid aging. Super activity typically occurs on fresh catalyst and declines rapidly due to accelerated coking and inhibition by complex molecules. Super activity is generally not representative of future deactivation trends. The catalyst will then generally see linear catalyst aging and then rapid aging toward the end of its life. Linear and rapid aging are more representative of future deactivation trends.

Enhanced Control

Aspects of the disclosure provide an enhanced control system that provides for prediction of catalysts cycle length and for controlling operational parameters to extend or accelerate the life of the catalyst.

Manipulation of operational parameters to extend or accelerate the life of the catalyst will depend on the careful selection and control of the processing conditions. There are many process variables that can affect hydrocracking performance, including operating severity, product yields and quality, and catalyst life. By careful monitoring and control of these process variables, the unit can be manipulated to affect catalyst deactivation. Monitoring also helps to collect data that can be correlated and used to predict behavior or problems in systems used in the same plant or in other plants and/or processes.

The amount of reactant conversion that takes place in the reactors may be determined by several variables: the type and amount of feedstock, the amount of time the feed is in the presence of catalyst, the partial pressure of hydrogen in the catalyst bed, and/or the temperature of the catalyst and reactants. Generally, the higher the temperature, the faster the rate of reaction and, therefore, the higher the conversion. The variables, such as temperature, pressure, flow rates, and feed/product compositions, may be sensed with sensors, measured, or calculated.

Sensor Data Collection and Processing

Figure 5A:
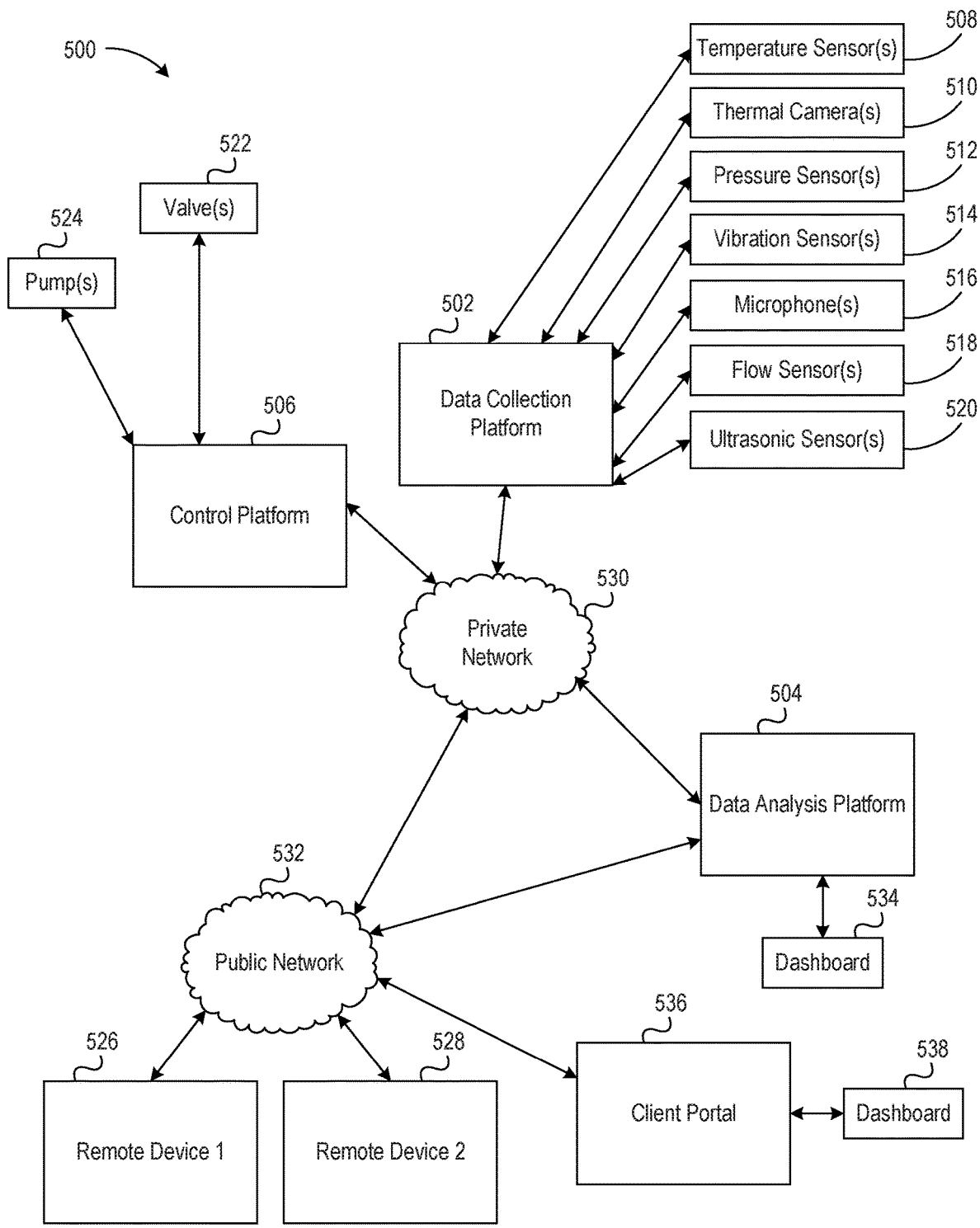
FIG. 5A depicts an illustrative computing environment for managing the operation of one or more pieces of equipment in a plant in accordance with one or more example embodiments.

The system may include one or more computing devices or platforms for collecting, storing, processing, and analyzing data from one or more sensors. FIG. 5A depicts an illustrative computing system that may be implemented at one or more components, pieces of equipment (e.g., catalytic reactors), and/or plants. FIG. 5A-FIG. 5E (hereinafter collectively "FIG. 5"), show, by way of illustration, various components of the illustrative computing system in which aspects of the disclosure may be practiced. Other components may be used, and structural and functional modifications may be made, in one or more other embodiments without departing from the scope of the present disclosure. Moreover, various connections between elements are discussed in the following description, and these connections are general and, unless specified otherwise, may be direct or indirect, wired or wireless, and/or combination thereof, and that the specification is not intended to be limiting in this respect.

FIG. 5A depicts an illustrative operating environment (e.g., computing system environment 500) in which various aspects of the present disclosure may be implemented in accordance with example embodiments. The computing system environment 500 illustrated in FIG. 5A is only one example of a suitable computing environment and is not intended to suggest any limitation as to the scope of use or functionality contained in the disclosure. The computing system environment 500 may include various sensor, measurement, and data capture systems, a data collection platform 502, a data analysis platform 504, a control platform 506, one or more networks (e.g., private network 530, public network 532), one or more remote devices (e.g., remote device 526, remote device 528), and/or one or more other elements. The numerous elements of the computing system environment 500 of FIG. 5A may be communicatively coupled through one or more networks. For example, the numerous platforms, devices, sensors, and/or components of the computing system environment may be communicatively coupled through a private network 530. The sensors may be positioned on various components in the plant and may communicate wirelessly or wired with one or more platforms illustrated in FIG. 5A. The private network 530 may include, in some examples, a network firewall device to prevent unauthorized access to the data and devices on the private network 530. Alternatively, the private network 530 may be isolated from external access through physical means, such as a hard-wired network with no external, direct-access point. The data communicated on the private network 530 may be optionally encrypted for further security. Depending on the frequency of collection and transmission of sensor measurements and other data to the data collection platform 502, the private network 530 may experience large bandwidth usage and be technologically designed and arranged to accommodate for such technological issues. Moreover, the computing system environment 500 may also include a public network 532 that may be accessible to remote devices (e.g., remote device 526, remote device 528). In some examples, the remote device (e.g., remote device 526, remote device 528) may be located not in the proximity (e.g., more than one mile away) of the various sensor, measurement, and data capture systems illustrated in FIG. 5A. In other examples, the remote device (e.g., remote device 526, remote device 528) may be physically located inside a plant, but restricted from access to the private network 530; in other words, the adjective "remote" need not necessarily require the device to be located at a great distance from the sensor systems and other components.

Although the computing system environment 500 of FIG. 5A illustrates logical block diagrams of numerous platforms and devices, the disclosure is not so limited. In particular, one or more of the logical boxes in FIG. 5 may be combined into a single logical box, or the functionality performed by a single logical box may be divided across multiple existing or new logical boxes. For example, aspects of the functionality performed by the data collection platform 502 may be incorporated into one or each of the sensor devices illustrated in FIG. 5A. As such, the data collection may occur local to the sensor device, and the enhanced sensor system may communicate directly with one or more of the control platform 506 and/or data analysis platform 504. Such an embodiment is contemplated by FIG. 5A. Moreover, in such an embodiment, the enhanced sensor system may measure values common to a sensor, but may also filter the measurements such just those values that are statistically relevant or of-interest to the computing system environment 500 are transmitted by the enhanced sensor system. As a result, the enhanced sensor system may include a processor (or other circuitry that enables execution of computer instructions) and a memory to store those instructions and/or filtered data values. The processor may be embodied as an application-specific integrated circuit (ASIC), FPGA, or other hardware- or software-based module for execution of instructions. In another example, one or more sensors illustrated in FIG. 5A may be combined into an enhanced, multi-purpose sensor system. Such a combined sensor system may provide economies of scale with respect to hardware components such as processors, memories, communication interfaces, and others.

In yet another example, the data collection platform 502 and data analysis platform 504 may reside on a single server computer and/or virtual machine and be depicted as a single, combined logical box on a system diagram. Moreover, a data store may be illustrated in FIG. 5A separate and apart from the data collection platform 502 and data analysis platform 504 to store a large amount of values collected from sensors and other components. The data store may be embodied in a database format and may be made accessible to the public network 532; meanwhile, the control platform 506, data collection platform 502, and data analysis platform 504 may be restricted to the private network 530 and left inaccessible to the public network 532. As such, the data collected from a plant may be shared with users (e.g., engineers, data scientists, others), a company's employees, and even third parties (e.g., subscribers to the company's data feed) without compromising potential security requirements related to operation of a plant. The data store may be accessible to one or more users and/or remote devices over the public network 532.

Referring to FIG. 5A, process measurements from various sensor and monitoring devices may be used to monitor conditions in, around, and on process equipment (e.g., catalytic reactors). Such sensors may include, but are not limited to, pressure sensors 512, differential pressure sensors, flow sensors 518, temperature sensors 508 including thermal cameras 510 and skin thermocouples, capacitance sensors, weight sensors, gas chromatographs, moisture sensors, ultrasonic sensors 520, position sensors, timing sensors, vibration sensors 514, level sensors, liquid level (hydraulic fluid) sensors, sound sensors (e.g., microphones 516), and other sensors commonly found in the refining and petrochemical industry. System operational measurements also can be taken to correlate the system operation to the heat exchanger measurements. Further, process laboratory measurements may be taken using gas chromatographs, liquid chromatographs, distillation measurements, reactor effluent measurements, recycle gas measurements, feed measurements, octane measurements, diesel measurements, unconverted oil product measurements, and other laboratory measurements. Table A, below, lists some illustrative laboratory test methods that may be used for sample streams and analysis of hydrocracking units.

TABLE A

| Stream | Analysis | Frequency |
|---|---|---|
| Feed | | |
| | Density/Specific Gravity | Daily |
| | Distillation | Daily |
| | Sulfur | Weekly |
| | Nitrogen | Daily |
| | Oxygen | Special |
| | Hydrogen | Special |
| | Aniline Point | Weekly |
| | Bromine Number | Weekly |
| | Carbon Residue | Weekly |
| | Asphaltenes ($C_7$ Insolubles) | Weekly |
| | Metals: Fe, Cu, Ni, V | Weekly |
| | Lead | Weekly |
| | Sodium | Weekly |
| | Silicon | Weekly |
| | Arsenic | Weekly |
| | Chloride | Special |
| | Viscosity | Special |
| | Water | Weekly |
| | Color | Daily |
| Diesel | | |
| | Density/Specific Gravity | Daily |
| | Distillation | Daily |
| | Sulfur | Weekly |
| | Nitrogen | Weekly |
| | Hydrogen | Special |
| | Flash Point | Daily |
| | Pour Point | Daily |
| | Cloud Point | Daily |
| | Aromatics | Weekly |
| | Cetane Number | Weekly |
| | Cetane Index | Weekly |
| | Color | Weekly |
| | Viscosity | Special |
| Unconverted Oil | | |
| | Density/Specific Gravity | Daily |
| | Distillation | Daily |
| | Sulfur | Weekly |
| | Nitrogen | Weekly |
| | Hydrogen | Special |
| | Carbon Residue | Soecial |
| | Flash Point | Daily |
| | Pour Point | Weekly |
| | Viscosity | Special |
| | Polynuclear Aromatics | |
| | HPNA | Weekly |
| | Refractive Index | Special |
| Hydrotreating Reactor Effluent (if equipped) | | |
| | Total Nitrogen | Daily |
| | Distillation | Special |
| | Density/Specific Gravity | Daily |
| | Sulfur | Special |

TABLE A-continued

| Stream | Analysis | Frequency |
|---|---|---|
| Recycle Gas | | |
| | Composition | Daily |
| | $H_2S$ | Weekly |

In addition, sensors may include transmitters and deviation alarms. These sensors may be programmed to set off an alarm, which may be audible and/or visual.

Other sensors may transmit signals to a processor or a hub that collects the data and sends to a processor. For example, temperature and pressure measurements may be sent to a hub (e.g., data collection platform). In one example, temperature sensors 508 may include thermocouples, fiber optic temperature measurement, thermal cameras 510, and/or infrared cameras. Skin thermocouples may be applied to supports or walls of a catalytic reactor. Alternatively, thermal (infrared) cameras 510 may be used to detect temperature (e.g., hot spots) in all aspects of the equipment. A shielded (insulated) tube skin thermocouple assembly may be used to obtain accurate measurements. One example of a thermocouple may be a removable XTRACTO Pad. A thermocouple can be replaced without any additional welding. Clips and/or pads may be utilized for ease of replacement. Fiber Optic cable can be attached to the line or vessel to provide a complete profile of temperatures.

Furthermore, flow sensors 518 may be used in flow paths such as the inlet to the path, outlet from the path, or within the path. If multiple feed pipes are utilized, the flow sensors 518 may be placed in corresponding positions in each of the pipes. Flow may be determined by pressure-drop across a known resistance, such as by using pressure taps. Other types of flow sensors 518 include, but are not limited to, ultrasonic, turban meter, hot wire anemometer, vane meter, Karman™, vortex sensor, membrane sensor (membrane has a thin film temperature sensor printed on the upstream side, and one on the downstream side), tracer, radiographic imaging (e.g., identify two-phase vs. single-phase region of channels), an orifice plate in front of or integral to each tube or channel, pitot tube, thermal conductivity flow meter, anemometer, internal pressure flow profile, and/or measure cross tracer (measuring when the flow crosses one plate and when the flow crosses another plate).

Sensor data, process measurements, and/or calculations made using the sensor data or process measurements may be used to monitor and/or improve the performance of the equipment and parts making up the equipment, as discussed in further detail below. For example, sensor data may be used to detect that a desirable or an undesirable chemical reaction is taking place within a particular piece of equipment, and one or more actions may be taken to encourage or inhibit the chemical reaction. Chemical sensors may be used to detect the presence of one or more chemicals or components in the streams, such as corrosive species, oxygen, hydrogen, and/or water (moisture). Chemical sensors may utilize gas chromatographs, liquid chromatographs, distillation measurements, and/or octane measurements. In another example, equipment information, such as wear, efficiency, production, state, or other condition information, may be gathered and determined based on sensor data.

Corrective action may be taken based on determining this equipment information. For example, if the equipment is showing signs of wear or failure, corrective actions may be taken, such as taking an inventory of parts to ensure replacement parts are available, ordering replacement parts, and/or alerting or calling in repair personnel to the site. Certain parts of equipment may be replaced immediately. Other parts may be safe to continue to use, but a monitoring schedule may be adjusted. Alternatively or additionally, one or more inputs or controls relating to a process may be adjusted as part of the corrective action. For example, one or more valves 522, pumps 524, or the like may be adjusted (e.g., opened, closed, partially opened, partially closed). These and other details about the equipment, sensors, processing of sensor data, and actions taken based on sensor data are described in further detail below.

Monitoring the equipment and processes includes collecting data that can be correlated and used to predict behavior or problems in other plants and/or processes. Data collected from the various sensors (e.g., measurements such as flow, pressure drop, thermal performance, vessel skin temperature at the top) may be correlated with external data, such as environmental or weather data. Process changes or operating conditions may be able to be altered to preserve the equipment until the next scheduled maintenance period. At a high level, sensor data collected (e.g., by the data collection platform) and data analysis (e.g., by the data analysis platform) may be used together, for example, for process simulation, equipment simulation, and/or other tasks. For example, sensor data may be used for process simulation and reconciliation of sensor data. The resulting, improved process simulation may provide a stream of physical properties that are used to calculate heat flow, etc. These calculations may lead to thermal and pressure drop performance prediction calculations for specific equipment, and comparisons of equipment predictions to observations from the operating data (e.g., predicted/expected outlet temperature and pressure vs. measured outlet temperature and pressure). This causes identification of conditions leading to temperature excursion, and/or other issues that eventually lead to a potential control changes and/or recommendation, etc. Control changes and/or recommendations may, in some embodiments, automatically be implemented by one or more computing systems (e.g., control platform 502) in the computing system environment 500.

Systems Facilitating Sensor Data Collection

Sensor data may be collected by a data collection platform 502. The sensors may interface with the data collection platform 502 via wired or wireless transmissions. Sensor data (e.g., temperature data) may be collected continuously or at periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). Data may be collected at different locations at different intervals. For example, data at a known hot spot may be collected at a first interval, and data at a spot that is not a known hot spot may be collected at a second interval. The data collection platform 502 may continuously or periodically (e.g., every second, every minute, every hour, every day, once a week, once a month) transmit collected sensor data to a data analysis platform, which may be nearby or remote from the data collection platform.

Figure 5B:
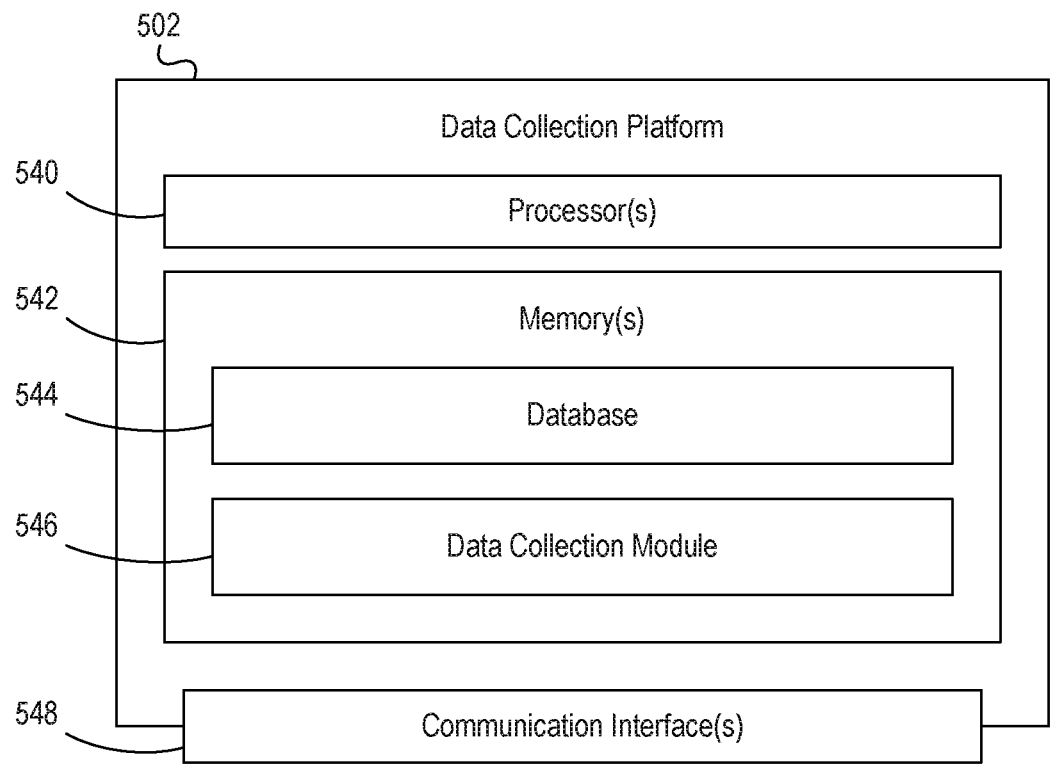
FIG. 5B depicts an illustrative data collection computing platform for collecting data related to the operation of one or more pieces of equipment in a plant in accordance with one or more example embodiments.
Figure 5C:
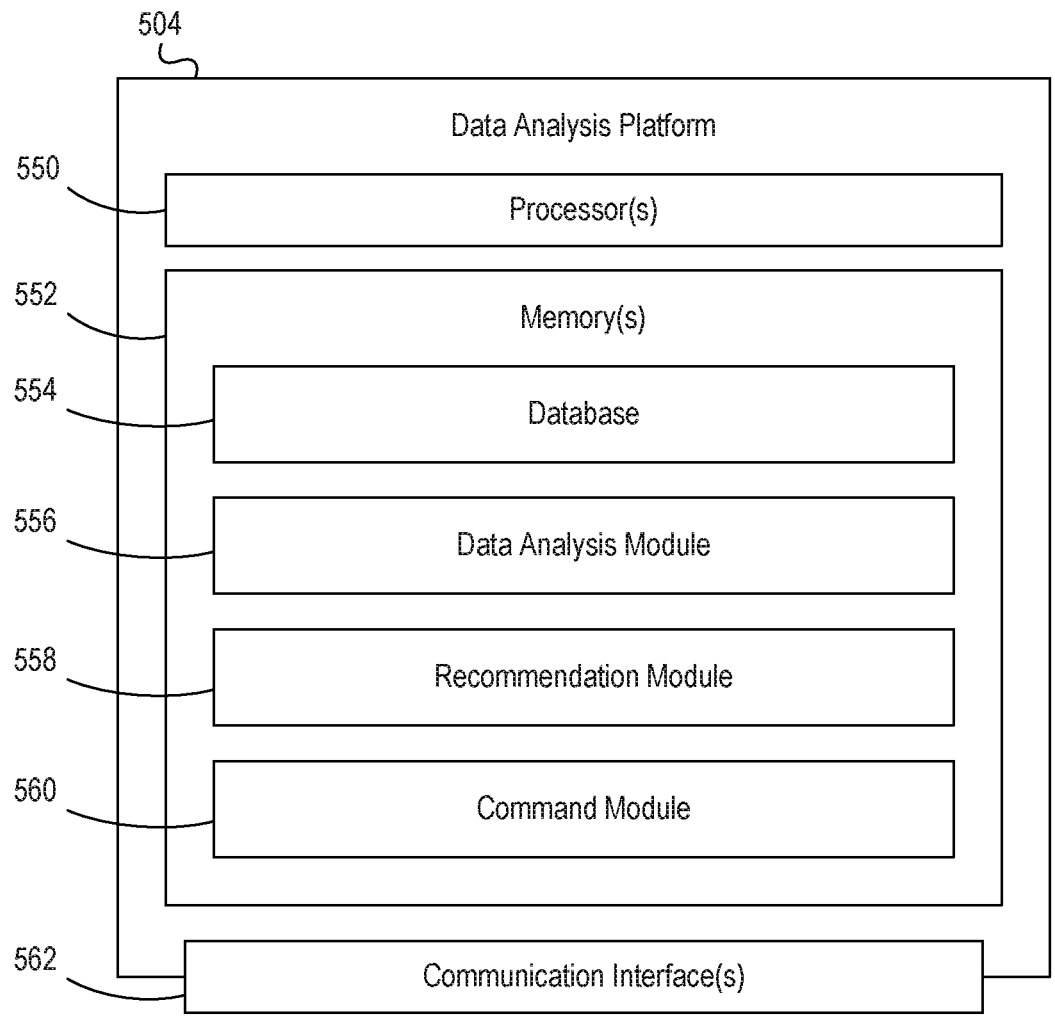
FIG. 5C depicts an illustrative data analysis computing platform for analyzing data related to the operation of one or more pieces of equipment in a plant in accordance with one or more example embodiments.
Figure 5D:
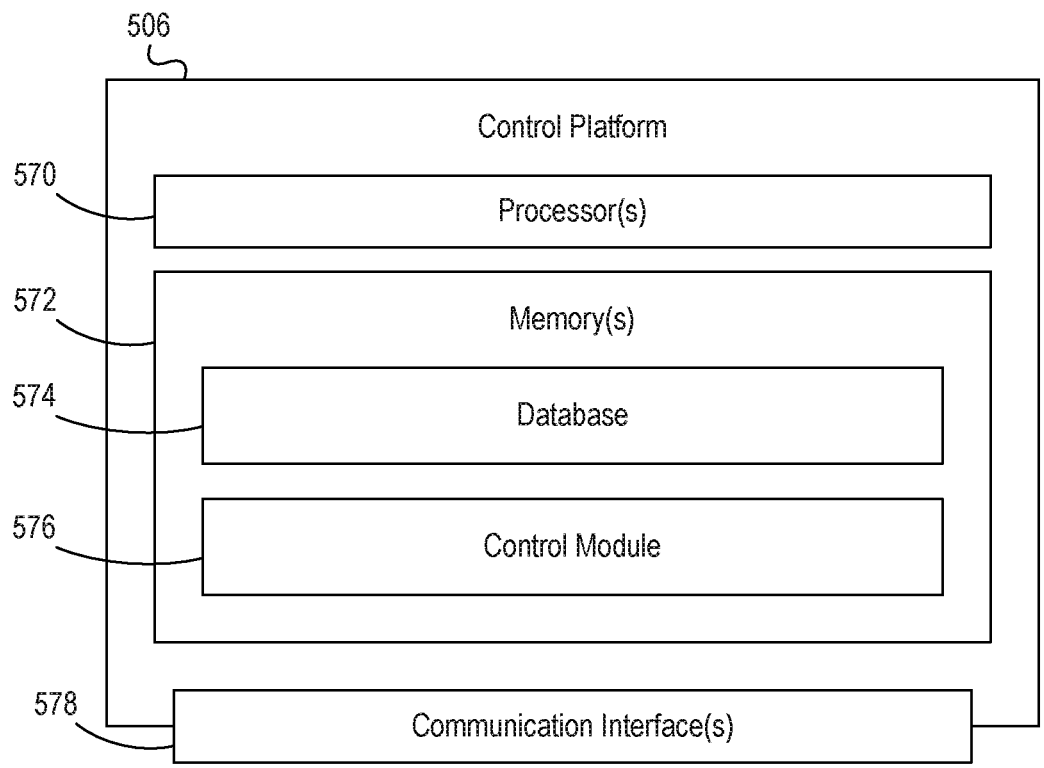
FIG. 5D depicts an illustrative data analysis computing platform for analyzing data related to the operation of one or more pieces of equipment in a plant in accordance with one or more example embodiments.
Figure 5E:
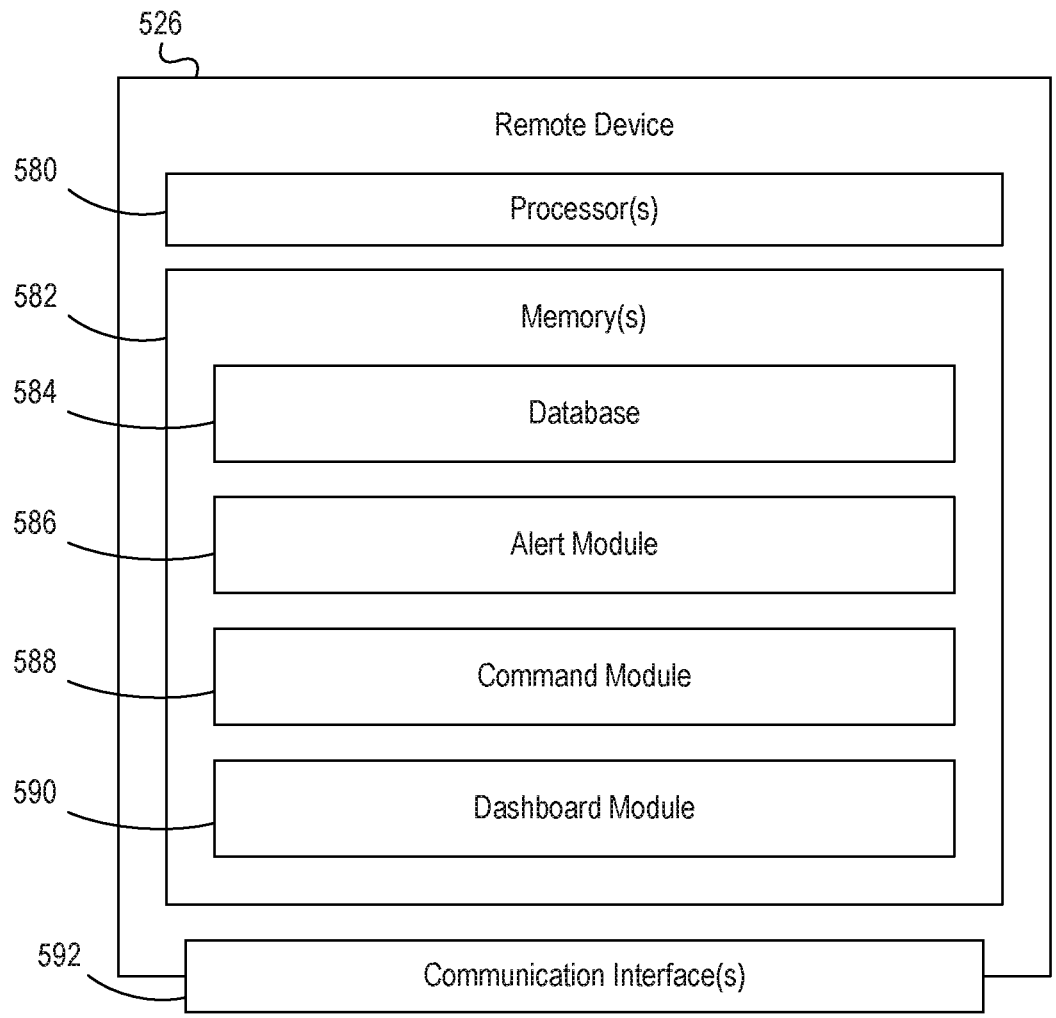
FIG. 5E depicts an illustrative control computing platform for controlling one or more pieces of equipment in a plant in accordance with one or more example embodiments.

The computing system environment 500 of FIG. 5A includes logical block diagrams of numerous platforms and devices that are further elaborated upon in FIG. 5B, FIG. 5C, FIG. 5D, and FIG. 5E. FIG. 5B is an illustrative data collection platform 502. FIG. 5C is an illustrative data analysis platform 504. FIG. 5D is an illustrative control platform 506. FIG. 5E is an illustrative remote device 526. These platforms and devices of FIG. 5 include one or more processing units (e.g., processors) to implement the methods and functions of certain aspects of the present disclosure in accordance with the example embodiments. The processors may include general-purpose microprocessors and/or special-purpose processors designed for particular computing system environments or configurations. For example, the processors may execute computer-executable instructions in the form of software and/or firmware stored in the memory of the platform or device. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, programmable consumer electronics, network PCs, minicomputers, mainframe computers, virtual machines, distributed computing environments that include any of the above systems or devices, and the like.

In addition, the platform and/or devices in FIG. 5 may include one or more memories include any of a variety of computer-readable media. Computer-readable media may be any available media that may be accessed by the data collection platform, may be non-transitory, and may include volatile and nonvolatile, removable and non-removable media implemented in any method or technology for storage of information such as computer-readable instructions, object code, data structures, database records, program modules, or other data. Examples of computer-readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by the data collection platform 502. The memories in the platform and/or devices may further store modules that may include compiled software code that causes the platform, device, and/or overall system to operate in a technologically improved manner as disclosed herein. For example, the memories may store software used by a computing platform, such as operating system, application programs, and/or associated database.

Furthermore, the platform and/or devices in FIG. 5 may include one or more communication interfaces including, but not limited to, a microphone, keypad, touch screen, and/or stylus through which a user of a computer (e.g., a remote device) may provide input, and may also include a speaker for providing audio output and a video display device for providing textual, audiovisual and/or graphical output. The communication interfaces may include a network controller for electronically communicating (e.g., wirelessly or wired) over a public network or private network with one or more other components on the network. The network controller may include electronic hardware for communicating over network protocols, including TCP/IP, UDP, Ethernet, and other protocols.

In some examples, one or more sensor devices in FIG. 5A may be enhanced by incorporating functionality that may otherwise be found in a data collection platform 502. These enhanced sensor system may provide further filtering of the measurements and readings collected from their sensor devices. For example, with some of the enhanced sensor systems in the operating environment illustrated in FIG. 5A, an increased amount of processing may occur at the sensor so as to reduce the amount of data needing to be transferred over a private network in real-time to a computing platform. The enhanced sensor system may filter at the sensor itself the measured/collected/captured data and only particular, filtered data may be transmitted to the data collection platform 502 for storage and/or analysis.

Referring to FIG. 5B, in one example, a data collection platform 502 may include a processor 540, one or more memories 542, and communication interfaces 548. The memory may include a database 544 for storing data records of various values collected from one or more sources. In addition, a data collection module 546 may be stored in the memory and assist the processor in the data collection platform 502 in communicating with, via the communications interface, one or more sensor, measurement, and data capture systems, and processing the data received from these sources. In some embodiments, the data collection module 546 may include computer-executable instructions that, when executed by the processor, cause the data collection platform 502 to perform one or more of the steps disclosed herein. In other embodiments, the data collection module 546 may be a hybrid of software-based and/or hardware-based instructions to perform one or more of the steps disclosed herein. In some examples, the data collection module 546 may assist an enhanced sensor system with further filtering the measurements and readings collected from the sensor devices.

Although the elements of FIG. 5B are illustrated as logical block diagrams, the disclosure is not so limited. In particular, one or more of the logical boxes in FIG. 5B may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database in FIG. 5B is illustrated as being stored inside one or more memories in the data collection platform, FIG. 5B contemplates that the database may be stored in a standalone data store communicatively coupled to the data collection module and processor of the data collection platform via the communications interface of the data collection platform.

In addition, the data collection module 546 may assist the processor 540 in the data collection platform 502 in communicating with, via the communications interface 548, and processing data received from other sources, such as data feeds from third-party servers and manual entry at the field site from a dashboard graphical user interface. For example, a third-party server may provide contemporaneous weather data to the data collection module. Some elements of chemical and petrochemical/refinery plants may be exposed to the outside and thus may be exposed to various environmental stresses. Such stresses may be weather related such as temperature extremes (hot and cold), high wind conditions, and precipitation conditions such as snow, ice, and rain. Other environmental conditions may be pollution particulates such as dust and pollen, or salt if located near an ocean, for example. Such stresses can affect the performance and lifetime of equipment in the plants. Different locations may have different environmental stresses. For example, a refinery in Texas will have different stresses than a chemical plant in Montana. In another example, data manually entered from a dashboard graphical user interface (or other means) may be collected and saved into memory by the data collection module. Production rates may be entered and saved in memory. Tracking production rates may indicate issues with catalyst. For example, as catalyst is used up, the production rate may fall if a specific production rate can no longer be achieved at a particular temperature, and the temperature has to be increased in order to maintain the same production rate.

Referring to FIG. 5C, in one example, a data analysis platform 504 may include a processor 550, one or more memories 552, and communication interfaces 562. The memory may include a database 554 for storing data records of various values collected from one or more sources. Alternatively, the database may be the same database as that depicted in FIG. 5B and the data analysis platform may communicatively couple with the database via the communication interface of the data analysis platform. At least one advantage of sharing a database between the two platforms is the reduced memory requirements due to not duplicating the same or similar data. In addition, a data analysis module 556 may be stored in the memory and assist the processor in the data analysis platform in processing and analyzing the data values stored in the database. In some embodiments, the data analysis module 556 may include computer-executable instructions that, when executed by the processor, cause the data analysis platform to perform one or more of the steps disclosed herein. In other embodiments, the data analysis module 556 may be a hybrid of software-based and/or hardware-based instructions to perform one or more of the steps disclosed herein. In some embodiments, the data analysis module 556 may perform statistical analysis, predictive analytics, and/or machine learning on the data values in the database to generate predictions and models. For example, the data analysis platform 504 may analyze sensor data to determine catalyst cycle days remaining. The data analysis platform 504 may compare temperature data from different dates to determine if changes are occurring. Such comparisons may be made on a monthly, weekly, daily, hourly, real-time, or some other basis.

Referring to FIG. 5C, the recommendation module 558 in the data analysis platform 504 may coordinate with the data analysis module 556 to generate recommendations for adjusting one or more parameters for the operation of the plant environment depicted in FIG. 5A. In some embodiments, the recommendation module 558 may communicate the recommendation to the command module 560, which generates command codes that may be transmitted, via the communications interface, to automatically cause adjustments or halting/starting of one or more operations in the plant environment. The command codes may be transmitted to a control platform for processing and/or execution. In an alternative embodiment, the command codes may be directly communicated, either wirelessly or in a wired fashion, to physical components at the plant such that the physical components include an interface to receive the commands and execute them.

The data analysis platform 504 may include one or more dashboards (e.g., dashboard 534), which may allow a user to view data, data analysis inputs, data analysis estimates, data analysis results, and/or otherwise interface with the data analysis module 556. Dashboard 534 may allow a user to view recommendations generated by the recommendation module 558. Dashboard 534 may allow a user to view commands generated by command module 560, provide commands, or the like.

One or more dashboards (e.g., dashboard 534) may interface directly with data analysis platform 504. Alternatively or additionally, one or more dashboards (e.g., dashboard 538) may provide similar features and/or functionality as dashboard 534, may be part of or interface with a client portal (e.g., client portal 536), which may be connected to a network (e.g., public network 532), and allow a client to interface with data analysis platform 504 via the network.

Although the elements of FIG. 5C are illustrated as logical block diagrams, the disclosure is not so limited. In particular, one or more of the logical boxes in FIG. 5C may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database 554 is visually depicted in FIG. 5C as being stored inside one or more memories in the data analysis platform, FIG. 5C contemplates that the database may be stored in a standalone data store communicatively coupled to the data analysis module and processor of the data analysis platform 504 via the communications interface 562 of the data analysis platform 504. Furthermore, the databases from multiple plant locations may be shared and holistically analyzed to identify one or more trends and/or patterns in the operation and behavior of the plant and/or plant equipment. In such a crowdsourcing-type example, a distributed database arrangement may be provided where a logical database may simply serve as an interface through which multiple, separate databases may be accessed. As such, a computer with predictive analytic capabilities may access the logical database to analyze, recommend, and/or predict the behavior of one or more aspects of plants and/or equipment. In another example, the data values from a database from each plant may be combined and/or collated into a single database where predictive analytic engines may perform calculations and prediction models.

Referring to FIG. 5D, in one example, a control platform 506 may include a processor 570, one or more memories 572, and communication interfaces 578. The memory may include a database 574 for storing data records of various values transmitted from a user interface, computing device, or other platform. The values may include parameter values for particular equipment at the plant. For example, some illustrative equipment at the plant that may be configured and/or controlled by the control platform 506 may include, but is not limited to, a feed switcher, sprayer, one or more valves 522, one or more pumps 524, one or more gates, and/or one or more drains. In addition, a control module 576 may be stored in the memory 572 and assist the processor 570 in the control platform 506 in receiving, storing, and transmitting the data values stored in the database 574. In some embodiments, the control module 576 may include computer-executable instructions that, when executed by the processor, cause the control platform 506 to perform one or more of the steps disclosed herein. In other embodiments, the control module 576 may be a hybrid of software-based and/or hardware-based instructions to perform one or more of the steps disclosed herein.

In a plant environment such as illustrated in FIG. 5A, if sensor data is outside of a safe range, this may be cause for immediate danger (e.g., a temperature excursion or runaway event). As such, there may be a real-time component to the system such that the system processes and responds in a timely manner. Although in some embodiments, data could be collected and leisurely analyzed over a lengthy period of months, numerous embodiments contemplate a real-time or near real-time responsiveness in analyzing and generating alerts, such as those generated or received by the alert module in FIG. 5E.

Referring to FIG. 5E, in one example, a remote device 526 may include a processor 580, one or more memories 582, and communication interfaces 592. The memory 582 may include a database 584 for storing data records of various values entered by a user or received through the communications interface 592. In addition, an alert module 586, command module 588, and/or dashboard module 590 may be stored in the memory 582 and assist the processor 580 in the remote device 526 in processing and analyzing the data values stored in the database 584. In some embodiments, the aforementioned modules may include computer-executable instructions that, when executed by the processor, cause the remote device 526 to perform one or more of the steps disclosed herein. In other embodiments, the aforementioned modules may be a hybrid of software-based and/or hardware-based instructions to perform one or more of the steps disclosed herein. In some embodiments, the aforementioned modules may generate alerts based on values received through the communications interface. The values may indicate a dangerous condition or even merely a warning condition due to particular sensor readings. The command module in the remote device 526 may generate a command that when transmitted through the communications interface 592 to the platforms at the plant, causes adjusting of one or more parameter operations of the plant environment depicted in FIG. 5A. In some embodiments, the dashboard module 590 may display a graphical user interface to a user of the remote device to enable the user to enter desired parameters and/or commands. These parameters/commands may be transmitted to the command module 588 to generate the appropriate resulting command codes that may be then transmitted, via the communications interface 592, to cause adjustments or halting/starting of one or more operations in the plant environment. The command codes may be transmitted to a control platform for processing and/or execution. In an alternative embodiment, the command codes may be directly communicated, either wirelessly or in a wired fashion, to physical components at the plant such that the physical components include an interface to receive the commands and execute them.

Although FIG. 5E is not so limited, in some embodiments the remote device 526 may include a desktop computer, a smartphone, a wireless device, a tablet computer, a laptop computer, and/or the like. The remote device 526 may be physically located locally or remotely, and may be connected by one of communications links to the public network 532 that is linked via a communications link to the private network 530. The network used to connect the remote device 526 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links may be any communications links suitable for communicating between workstations and server, such as network links, dial-up links, wireless links, hard-wired links, as well as network types developed in the future, and the like. Various protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers may be used to display and manipulate data on web pages.

Although the elements of FIG. 5E are illustrated as logical block diagrams, the disclosure is not so limited. In particular, one or more of the logical boxes in FIG. 5E may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database is visually depicted in FIG. 5E as being stored inside one or more memories in the remote device 526, FIG. 5E contemplates that the database may be stored in a standalone data store communicatively coupled, via the communications interface, to the modules stored at the remote device and processor of the remote device.

Referring to FIG. 5, in some examples, the performance of operation in a plant may be improved by using a cloud computing infrastructure and associated methods, as described in U.S. Patent Application Publication No. 2016/0260041, which was published Sep. 8, 2016, and which is herein incorporated by reference in its entirety. The methods may include, in some examples, obtaining plant operation information from the plant and/or generating a plant process model using the plant operation information. The method may include receiving plant operation information over the Internet, or other computer network (including those described herein) and automatically generating a plant process model using the plant operation information. These plant process models may be configured and used to monitor, predict, and/or optimize performance of individual process units, operating blocks and/or complete processing systems. Routine and frequent analysis of predicted versus actual performance may further allow early identification of operational discrepancies that may be acted upon to optimize impact, including financial or other impact.

The aforementioned cloud computing infrastructure may use a data collection platform 502 associated with a plant to capture data, e.g., sensor measurements, which may be automatically sent to the cloud infrastructure, which may be remotely located, where it is reviewed to, for example, eliminate errors and biases, and used to calculate and report performance results. The data collection platform 502 may include an optimization unit that acquires data from a customer site, other site, and/or plant (e.g., sensors and other data collectors at a plant) on a recurring basis. For cleansing, the data may be analyzed for completeness and corrected for gross errors by the optimization unit. The data may also be corrected for measurement issues (e.g., an accuracy problem for establishing a simulation steady state) and overall mass balance closure to generate a duplicate set of reconciled plant data. The corrected data may be used as an input to a simulation process, in which the process model is tuned to ensure that the simulation process matches the reconciled plant data. An output of the reconciled plant data may be used to generate predicted data using a collection of virtual process model objects as a unit of process design.

The performance of the plant and/or individual process units of the plant may be compared to the performance predicted by one or more process models to identify any operating differences or gaps. Furthermore, the process models and collected data (e.g., plant operation information) may be used to run optimization routines that converge on an optimal plant operation for a given values of, e.g., feed, products, and/or prices. A routine may be understood to refer to a sequence of computer programs or instructions for performing a particular task.

The data analysis platform 504 may include an analysis unit that determines operating status, based on at least one of a kinetic model, a parametric model, an analytical tool, and/or a related knowledge and best practice standard. The analysis unit may receive historical and/or current performance data from one or a plurality of plants to proactively predict future actions to be performed. To predict various limits of a particular process and stay within the acceptable range of limits, the analysis unit may determine target operational parameters of a final product based on actual current and/or historical operational parameters. This evaluation by the analysis unit may be used to proactively predict future actions to be performed. In another example, the analysis unit may establish a boundary or threshold of an operating parameter of the plant based on at least one of an existing limit and an operation condition. In yet another example, the analysis unit may establish a relationship between at least two operational parameters related to a specific process for the operation of the plant. Finally, in yet another example, one or more of the aforementioned examples may be performed with or without a combination of the other examples.

The plant process model predicts plant performance that is expected based upon the plant operation information. The plant process model results can be used to monitor the health of the plant and to determine whether any upset or poor measurement occurred. The plant process model is desirably generated by an iterative process that models at various plant constraints to determine the desired plant process model.

Using a web-based system provides many benefits, such as improved plant economic performance due to an increased ability by plant operators to identify and capture economic opportunities, a sustained ability to bridge plant performance gaps, and an increased ability to leverage personnel expertise and improve training and development. Some of the methods disclosed herein allow for automated daily (or other interval-based) evaluation of process performance, thereby increasing the frequency of performance review with less time and effort from plant operations staff.

Further, the analytics unit may be partially or fully automated. In some embodiments, the system may be a computer system, such as a third-party computer system, remote from the plant and/or the plant planning center. The system may receive signals and parameters via the communication network, and displays in real time related performance information on an interactive display device accessible to an operator or user. The web-based platform allows all users to work with the same information, thereby creating a collaborative environment for sharing best practices or for troubleshooting. The method further provides more accurate prediction and optimization results due to fully configured models. Routine automated evaluation of plant planning and operation models allows timely plant model tuning to reduce or eliminate gaps between plant models and the actual plant performance. Implementing the aforementioned methods using the web-based platform also allows for monitoring and updating multiple sites, thereby better enabling facility planners to propose realistic optimal targets.

In some aspects, if a particular condition is detected, the control platform 506 may take one or more actions, which may be triggered, requested, or recommended by the data analysis platform. Alternatively or additionally, data analysis platform 504 may trigger an alert to one or more remote devices (e.g., remote device 1, remote device 2). The alert may include information about the condition. The alert may provide information about one or more determined correlations between one or more variables (e.g., measured by one or more sensors) and a particular operating condition or combination of operating conditions. The alert may include one or more recommendations for and/or commands causing adjustments to operating conditions, such as adjustments to flows, valves, nozzles, drains, or the like.

In some aspects, a remote device may send a command for a particular action (e.g., a corrective action) to be taken, which may or may not be based on the alert. In some aspects, data analysis platform may send a command for a particular action to be taken, whether or not an alert was sent to or a command was sent by the remote device. The command may cause one or more actions to be taken, which may mitigate or prevent equipment damage, avoid failure, or the like.

Detecting and Predicting Catalyst Bed Life

The enhanced control and analysis system described herein provides for prediction of catalyst cycle length and for controlling or manipulating operational parameters to extend or accelerate the life of the catalyst. The process variables can affect hydrocracking performance including operating severity, product yields and quality, and catalyst life. By careful monitoring and control of these process variables, the unit can be manipulated to affect catalyst deactivation.

For example, the amount of reactant conversion that takes place in the reactors may be determined by the type and amount of feedstock, the amount of time the feed is in the presence of catalyst, the partial pressure of hydrogen in the catalyst bed, and the temperature of the catalyst and reactants. Generally, the higher the temperature, the faster the rate of reaction and therefore, the higher the conversion.

One or more process variables might be adjusted to shorted or extend catalyst life, based on the detected and/or predicted catalyst life. The control platform may receive one or more commands to adjust a valve, a flow rate, a temperature, a pressure, or the like.

Listed below are exemplary process variables (or indicators) and respective definitions. Illustrative locations of relevant sensors that collect data used in different variables are indicated in FIGS. 1-4. The locations are numbered 1-9 and are shown enclosed in boxes.

Table B, below, indicates variables for normalized treating.

TABLE B

| Location | Variable | Units | Variable Definition |
| --- | --- | --- | --- |
| 2 | WABT Treating | deg F | Weighted Average Bed Temperature- calculated from treating reactor bed temperature measurements |
| 1 | Feed rate (FF basis) | bpd | Calculated from feed flow meter (corrected with laboratory calculated feed density) |
| 4 | Reactor Outlet Pressure | | From pressure measurement on separator and reactor DP measurements |
| 4 | Recycle Gas Purity | mol-% | From recycle gas laboratory sample analyzed on GC in laboratory |
| | Inlet H2 Partial Pressure | psia | calculated from reactor circuit pressure and laboratory results |
| 5 | Reactor Outlet Nitrogen (FF basis) | wppm | calculated in laboratory from reactor effluent sample |
| 1 | Predicted N Slip (FF basis) | wppm | calculated value |
| 1 | Fresh Feed N content | wppm | from laboratory analysis of the feed |
| 1 | Fresh Feed S content | wt-% | from laboratory analysis of the feed |
| 1 | Feed S.G. | | from laboratory analysis of the feed |
| 1 | Feed API gravity | | from laboratory analysis of the feed |
| 1 | Feed distillation 10% | deg F | from laboratory analysis of the feed |
| 1 | Feed distillation 50% | deg F | from laboratory analysis of the feed |
| 1 | Feed distillation 90% | deg F | from laboratory analysis of the feed |
| 1 | Feed distillation End Point | deg F | from laboratory analysis of the feed |
| 1 | Feed Average Boiling Point | deg F | from laboratory analysis of the feed |
| 1 | Feed Aniline Point | deg F | from laboratory analysis of the feed |
| 1 | Feed Sulfur | deg F | from laboratory analysis of the feed |
| 1 | Feed Bromine Index | deg F | from laboratory analysis of the feed |
| | Normalized Average Bed Temperature | deg F | calculated value based on the other variables in this list |
| | Days on stream | days | |

Table C, below, indicates variables for normalized cracking.

TABLE C

| Location | Variable | Units | Variable Definition |
| --- | --- | --- | --- |
| 3 | WABT Cracking | deg F | Weighted Average Bed Temperature- calculated from cracking reactor bed temperature measurements |
| 1 | Feed rate (RC basis) | bpd | Calculated from feed flow meter (corrected with laboratory calculated feed density) |
| 5 | R1 Outlet | psig | From pressure measurement on separator and reactor DP measurements |

TABLE C-continued

| Location | Variable | Units | Variable Definition |
|---|---|---|---|
| 4 | Recycle Gas Purity (Inlet) | % | From recycle gas laboratory sample analyzed on GC in laboratory |
|  | Inlet H2 Partial Pressure | psia | calculated from reactor circuit pressure and laboratory results |
| 1 | LHSV (RC basis) | /hr | Calculated from feed flow meter (corrected with laboratory calculated feed density) |
| 6 | RG Rate (RC basis) | SCFB | Calculated from the recycle gas flowmeter and recycle gas laboratory analysis |
| 1, 7, 8 | Conversion Per Pass | vol-% | calculated value based on feed and product flows |
| 8, 9 | Diesel Cut Point | deg F | based on the diesel and unconverted oil product laboratory analysis |
| 1 | Feed S.G. |  | from laboratory analysis of the feed |
| 1 | Fresh Feed N content | wppm | from laboratory analysis of the feed |
| 1 | Reactor Inlet Nitrogen | wppm | calculation based on the feed rate and laboratory analysis of the feed |
|  | Normalized WABT | deg F | calculated value based on the other variables in this list |
| 1 | Feed API gravity |  | from laboratory analysis of the feed |
| 1 | Feed distillation 10% | deg F | from laboratory analysis of the feed |
| 1 | Feed distillation 50% | deg F | from laboratory analysis of the feed |
| 1 | Feed distillation 90% | deg F | from laboratory analysis of the feed |
| 1 | Feed distillation End Point | deg F | from laboratory analysis of the feed |
| 1 | Feed Average Boiling Point | deg F | from laboratory analysis of the feed |
| 1 | Feed Aniline Point | deg F | from laboratory analysis of the feed |
|  | Days on stream | days |  |

Calculating the normalized average catalytic bed (NABT) for the hydrotreating and hydrocracking reactors may indicate piece-wise linear trend over the catalyst life cycle. Fresh feed, conversion, feed nitrogen, or any other variable may be used to remove or filter the outliers and noise in the data. Breaks in the linear trend if NABT with respect to number of days catalyst is in use may be detected using the Eigen analysis. Eigen values may be computed for NABT and corresponding days within a window. If second Eigen value is less than a threshold, then NABT may be considered as linear, otherwise may be considered a break point. If a case break point is not reached, new data may be added to old data and Eigen values continue to be calculated. This procedure may be repeated. If a case break point is reached, old data may be ignored and new data taken for computing the Eigen values. Linearity may be checked by looking at Eigen values. Once the Eigen values confirm that the data is linear, then a linear regression line may be fit to that piece of data, and the line may be projected onto designed max NABT. The intersection point of the projected line and designed max NABT gives the survival time of catalyst.

In another method, the intersection point of first Eigen vector (one with max Eigen value, computed using Normalized bed temperatures and corresponding days) with the designed max Normalized bed temperature vector may be determined, which may give the number of days catalyst can survive under the current operating conditions. Breaks in the linear trend, if NABT with respect to number of days catalyst is in use, may be detected using linear regression using root mean square error (RMSE) and R-square metrics. Linear fit may be computed for NABT and corresponding days with in a window. If RMSE is less than a threshold and R-square is greater than a threshold, then NABT may be considered as linear, and otherwise may be considered a break point. If break point is not reached, new data may be added to old data and linear fit computed and the above procedure repeated. If break point is reached, old data may be ignored and new data may be taken for computing the linear fit, and linearity may be checked by looking at RMSE and R-square values. Once the algorithm confirms data is linear for a segment, then a linear regression line may be fit to that piece of data and the line may be projected onto designed max NABT. The intersection point of projected line and deigned max NABT may give the survival time of catalyst.

All the major chemical reactions that take place may be exothermic. Therefore, the temperature increases as the feed and recycle gas proceed through the catalyst beds. In some embodiments, it may be important that the temperature increase (delta T) be controlled carefully at all times. It is possible to generate more heat from the reactions than the flowing streams can remove from the reactors. If this happens, the temperature may increase very rapidly. This condition is called a temperature excursion or a temperature runaway, which can cause damage to the catalyst or to the reactors. In order to properly monitor the reactions as the reactants pass through the catalyst bed, it is not sufficient to just measure the temperature of the flowing stream at the inlet and outlet of the reactor. It is necessary to observe the temperature at the inlet, outlet, and radially throughout the catalyst bed.

Catalyst bed thermocouples are extremely useful for judging the effective utilization of the catalyst. A bed thermocouple is measuring the temperature at one point in a large cross-sectional area. If temperature maldistribution is occurring, then the bed thermocouple might not be necessarily representative of the average catalyst temperature. Causes of temperature maldistribution include poor catalyst loading, mechanical problems with internals, or coke formation resulting from unit upsets or a temperature excursion.

Processing Data and Sending Alerts

Figure 6A:
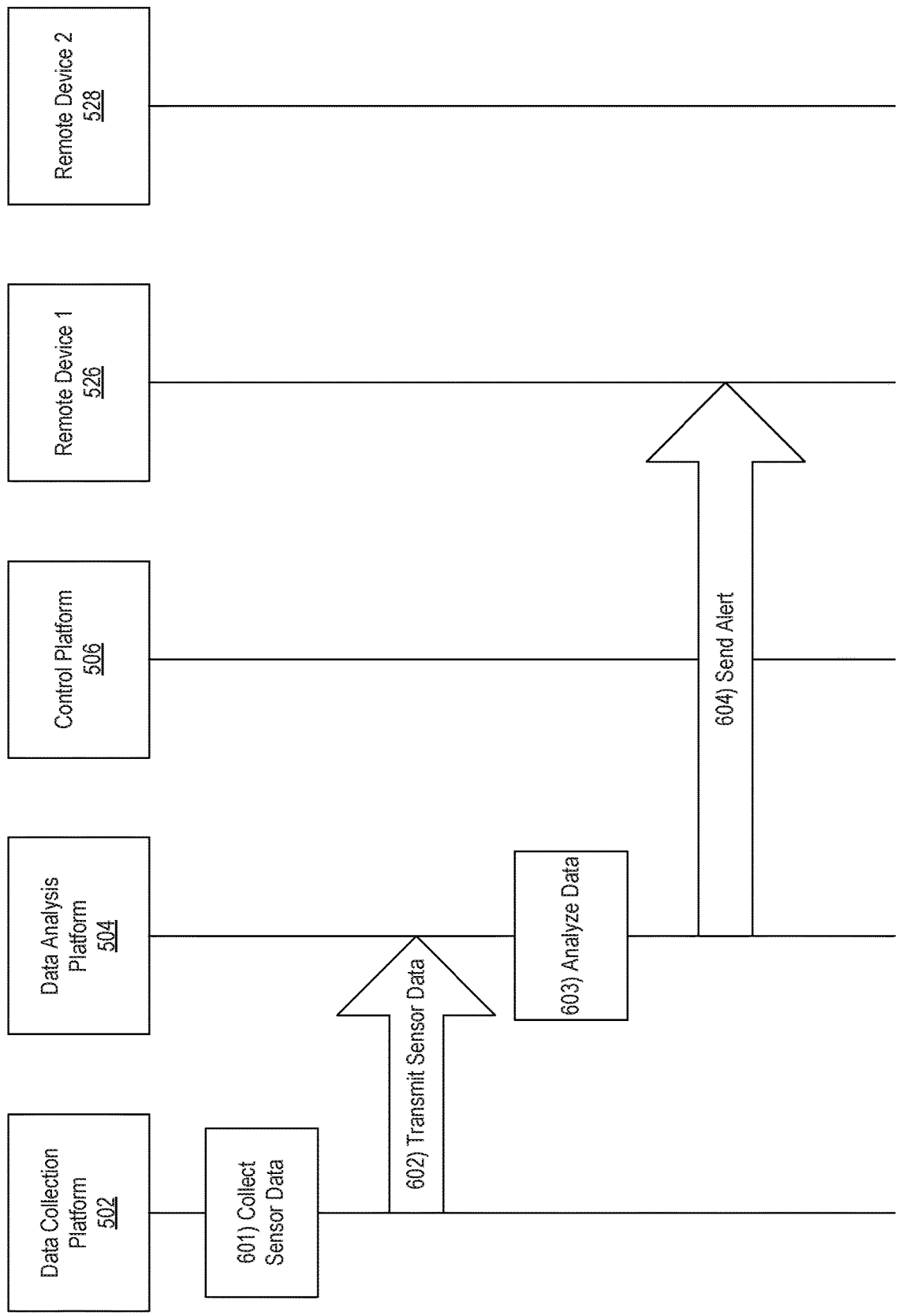

FIGS. 6A-6B depict illustrative system flow diagrams in accordance with one or more embodiments described herein. As shown in FIG. 6A, in step 601, data collection platform may collect sensor data. In step 602, data collection platform may transmit sensor data to data analysis platform. In step 603, data analysis platform may analyze data. In step 604, data analysis platform may send an alert to remote device 1 and/or remote device 2.

As shown in FIG. 6B, in step 605, data analysis platform may receive a command from remote device 1 and/or remote device 2. In some embodiments, the control platform may receive the command from remote device 1 and/or remote device 2. In step 606, data analysis platform may send a command to control platform. In some embodiments, the command may be similar to the command received from remote device 1 and/or remote device 2. In some embodiments, data analysis platform may perform additional analysis based on the received command from remote device 1 and/or remote device 2 before sending a command to control platform. In step 607, control platform may take corrective action. The corrective action may be based on the command received from data analysis platform, remote device 1, and/or remote device 2. The corrective action may be related to one or more pieces of equipment associated with sensors that collected the sensor data in step 601. For example, the control platform may automatically adjust a gate, a valve, a flow rate, a drain, or the like.

Dashboard

FIGS. 7A-7F depict an illustrative dashboard 700 that may include information about the operation of a catalyst reaction system in accordance with one or more aspects described herein. The dashboard may include or be a part of one or more graphical user interfaces of one or more applications that may provide information received from one or more sensors or determined based on analyzing information received from one or more sensors, according to one or more embodiments described herein. The dashboard may be displayed as part of a smartphone application (e.g., running on a remote device, such as remote device 1 or remote device 2), a desktop application, a web application (e.g., that runs in a web browser), a web site, an application running on a plant computer, or the like.

The dashboard may be different based on an intended user of the dashboard. For example, one or more systems depicted in FIG. 5A may interface with or provide a dashboard. Different dashboards may provide the same or different information, charts, graphs, buttons, functions, and the like.

Returning to FIG. 7A, the dashboard 700 may include one or more visual representations of data (e.g., chart, graph) that shows information about a plant, a particular piece of equipment in a plant, or a process performed by a plant or a particular piece or combination of equipment in the plant. For example, the dashboard may show information about production, top constraints, and/or severity. Specifically, production information may include fresh feed rate, C5+yield, naphtha product, diesel product, and/or jet product. Top constraints information may include operational constraints and/or HS&E constraints. Severity information may include catalyst cycle days remaining, cracking catalyst health, treating catalyst health, feed severity, and/or conversion. The dashboard may include a description of the equipment, the combination of equipment, or the plant to which the visual display of information pertains. The dashboard may include information pertaining to overview, HS&E, economics, mass balance, energy balance, and/or unit. The dashboard may include profit information, such as predicted and actual profit.

In some aspects, data displayed by the dashboard may be refreshed in real time, according to a preset schedule (e.g., every five seconds, every ten seconds, every minute), and/or in response to a refresh request received from a user. The dashboard may include information about the last time the data displayed on the dashboard was updated and/or the last time the dashboard was updated.

The dashboard may include a contact name and/or contact information (e.g., telephone number, pager number, email address, text message number, social media account name) for a sales representative. Then, for example, if a dashboard user needs assistance (e.g., purchasing more burners, seeking assistance for repairs, finding out more information about purchased products), the dashboard user may easily contact the sales representative.

The dashboard may include a contact name and/or contact information for technical support. Then, for example, if the dashboard user using the dashboard needs assistance (e.g., interpreting dashboard data, adjusting a product level, adjusting an equipment setting, adjusting an operating characteristic), the dashboard user may easily contact technical support.

The dashboard may display the information for a particular time or period of time (e.g., the last five minutes, the last ten minutes, the last hour, the last two hours, the last 12 hours, the last 24 hours, the last 30 days, multiple months). The dashboard may be adjustable to show different ranges of time, automatically or based on user input.

Figure 7A:
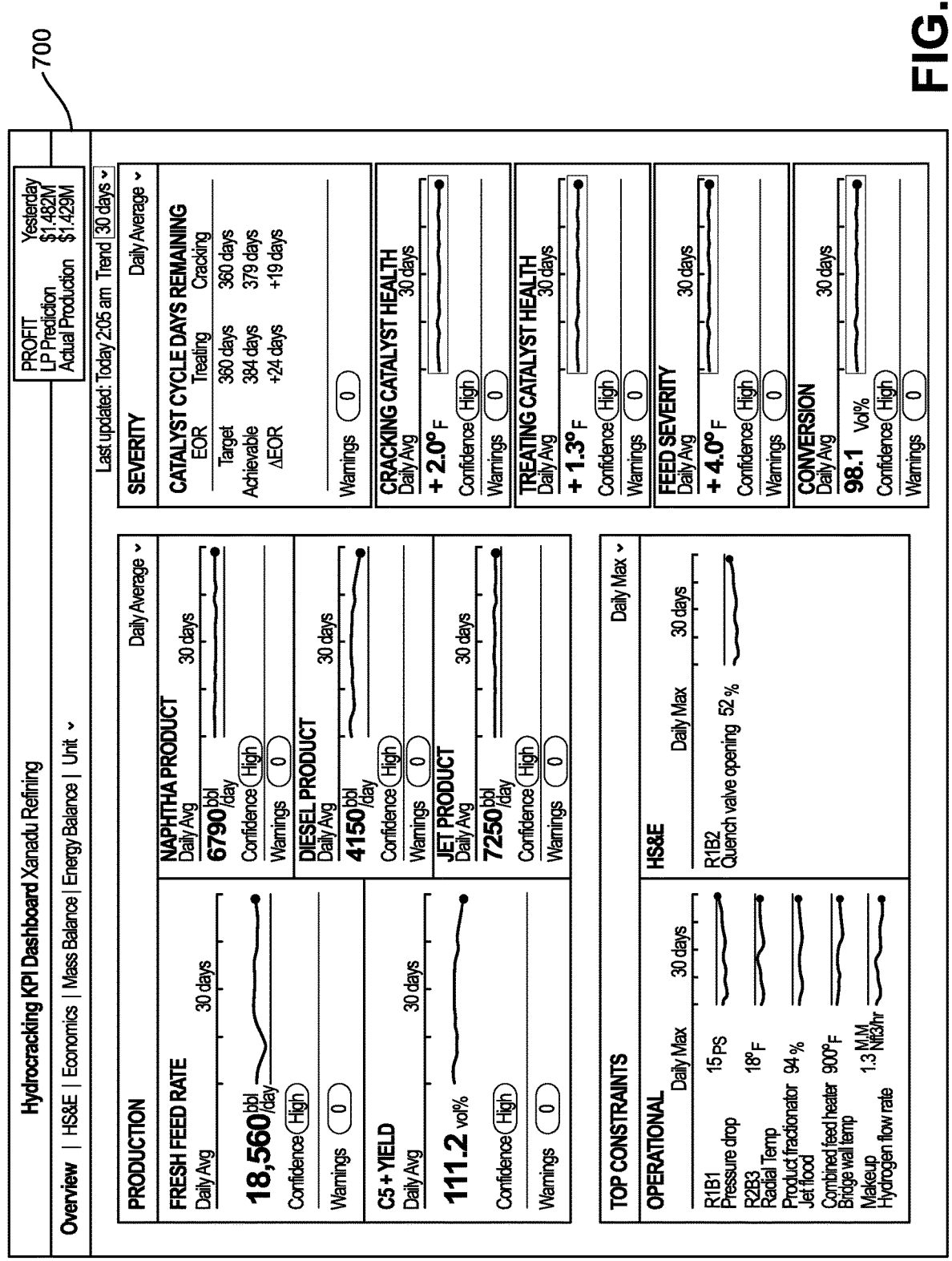
FIGS. 7A-7F depict illustrative graphical user interfaces related to one or more aspects of a plant operation in accordance with one or more example embodiments.

The dashboard may display a time and/or date range of the time and/or date range for which data is being displayed. For example, FIG. 7A depicts a period of 30 days. The dashboard may allow for changing the time period. For example, a pop-up window may be triggered (e.g., by selecting an interface option, such as a drop-down arrow). The pop-up window may allow selection of a time period (e.g., years, quarters, months, weeks, days, hours, minutes) for displaying data. The pop-up window may allow selection of a range of data for a selected time (e.g., previous week, this week, next week, last x number of weeks, next x number of weeks, week to date).

The dashboard may include a prediction of a number of catalyst days remaining. This prediction may be based on one or more pieces of sensor data gathered from sensors in the plant, as described herein.

The dashboard may include an indication of cracking catalyst health. The cracking catalyst health information may include a daily average temperature, displayed as a number, and/or a graph showing a visual of the daily average temperature. The daily average temperature may indicate a number of degrees that the cracking catalyst is better than or worse than a baseline health. For example, based on a particular set of starting conditions, as well as how long the catalyst has been in use, the catalyst may be expected to operate at a particular temperature. The cracking catalyst health daily average temperature, then, shows a deviation (better or worse) than the expected temperature. This information may provide an operator with additional information on the health and/or expected remaining life of the cracking catalyst. The dashboard may include an indication of a confidence level (e.g., low, medium, high) for the cracking catalyst health. The dashboard may include an indication of how many warnings are pending for the cracking catalyst health.

The dashboard may include an indication of treating catalyst health. The treating catalyst health information may include a daily average temperature, displayed as a number, and/or a graph showing a visual of the daily average temperature. The daily average temperature may indicate a number of degrees that the treating catalyst is better than or worse than a baseline health. For example, based on a particular set of starting conditions, as well as how long the catalyst has been in use, the catalyst may be expected to operate at a particular temperature. The treating catalyst health daily average temperature, then, shows a deviation (better or worse) than the expected temperature. This information may provide an operator with additional information on the health and/or expected remaining life of the treating catalyst. The dashboard may include an indication of a confidence level (e.g., low, medium, high) for the treating catalyst health. The dashboard may include an indication of how many warnings are pending for the treating catalyst health.

The dashboard may include an indication of feed severity. The feed severity information may include a daily average temperature, displayed as a number, and/or a graph showing a visual of the daily average temperature. The daily average temperature may indicate a number of degrees that the feed is different from a baseline temperature. For example, based on one or more conditions, the feed may be expected to operate at a particular temperature. The feed daily average temperature, then, shows a deviation (better or worse) than the expected temperature. This information may provide an operator with additional information on the feed. The dashboard may include an indication of a confidence level (e.g., low, medium, high) for the feed severity temperature average. The dashboard may include an indication of how many warnings are pending for the feed.

The dashboard may include an indication of conversion rate. The conversion information may include a daily average percentage, displayed as a number, and/or a graph showing a visual of the daily average percentage. The daily average percentage may indicate a percentage of the feed that is converted to a desired product. This information may provide an operator with additional information on the efficiency of the plant or equipment. The dashboard may include an indication of a confidence level (e.g., low, medium, high) for the conversion rate. The dashboard may include an indication of how many warnings are pending for the conversion rate.

Figure 7B:
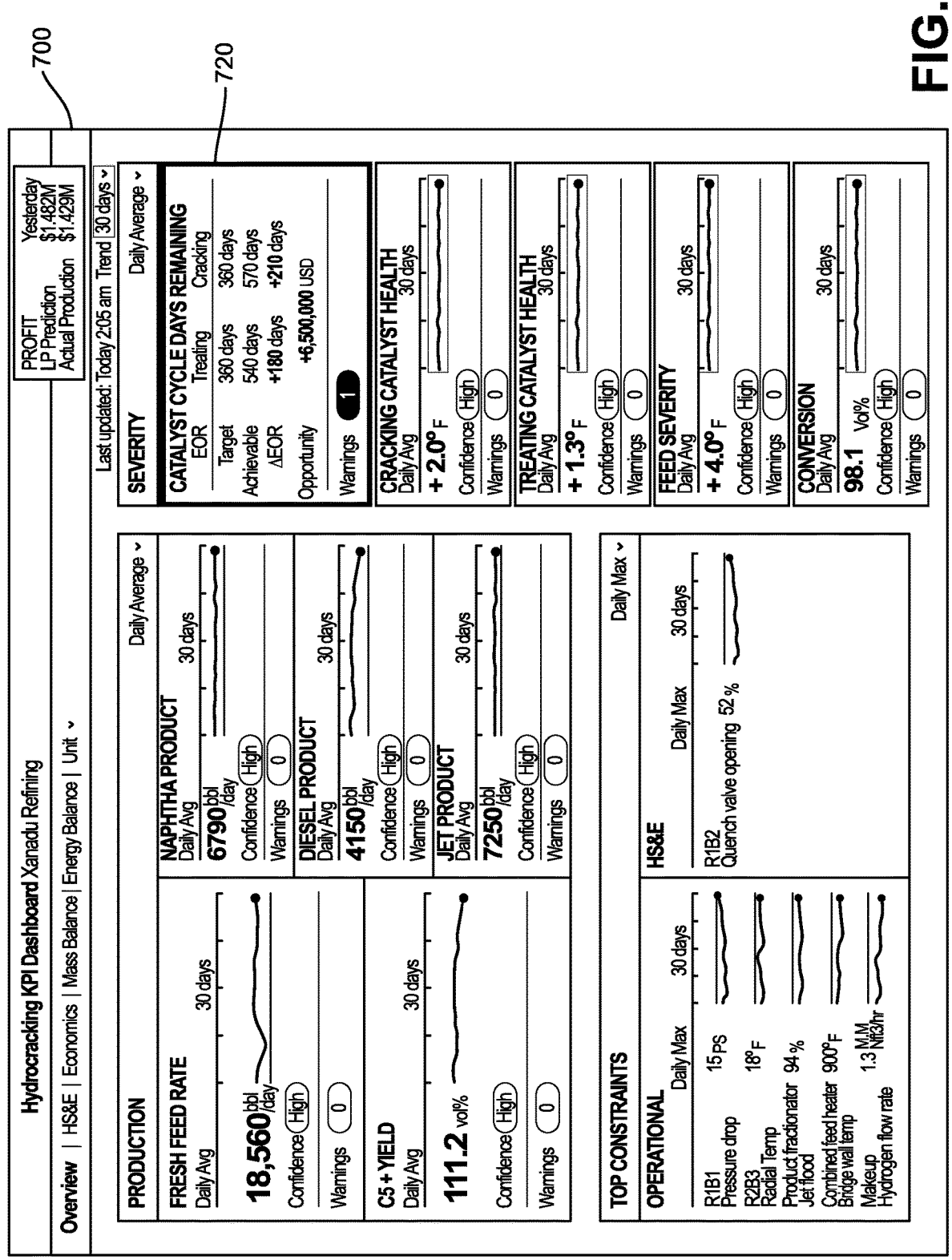

As depicted in FIG. 7B, the dashboard 700 may provide an alert or warning 720 about a number of catalyst cycle days remaining. For example, if an opportunity to increase profits (e.g., by increasing operating conditions so as to improve efficiencies) is determined, the dashboard may provide a visual indication (e.g., an alert) that an opportunity is available. In some embodiments, the visual indication may be triggered based on the opportunity exceeding a threshold value. For example, as depicted in FIG. 7B, an opportunity to save $6.5 million dollars in profit has been determined. This is based on a determined prediction that the end-of-run for the treating catalyst is predicted to be 180 days after than the original target end-of-run date, and the end-of-run for the cracking catalyst is predicted to be 210 days after than the original target end-of-run date.

Figure 7C:
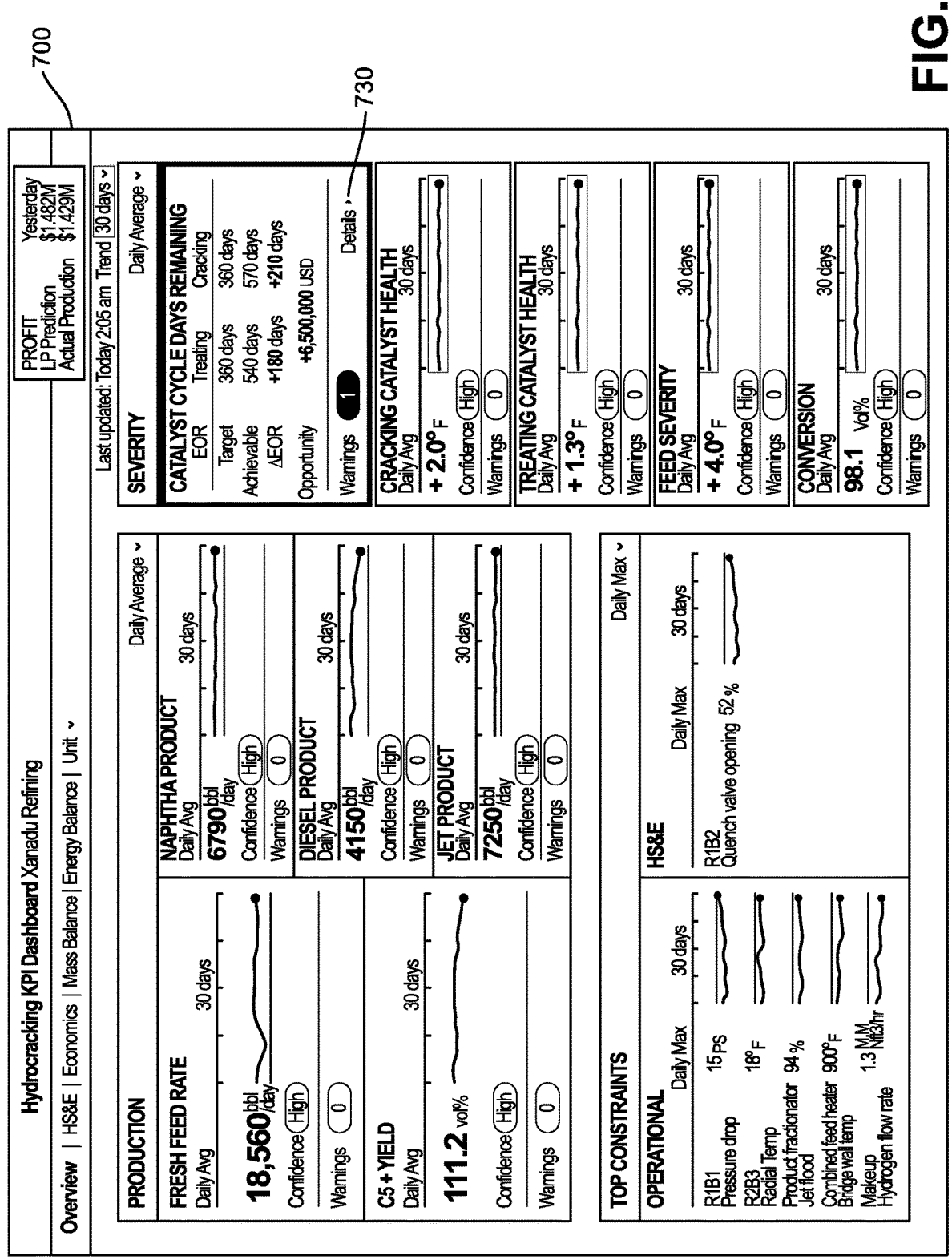

As depicted in FIG. 7C, a "details" button 730 may be displayed to provide the opportunity for a dashboard user to request additional details about a warning or determined profit or efficiency improvement.

Figure 7D:
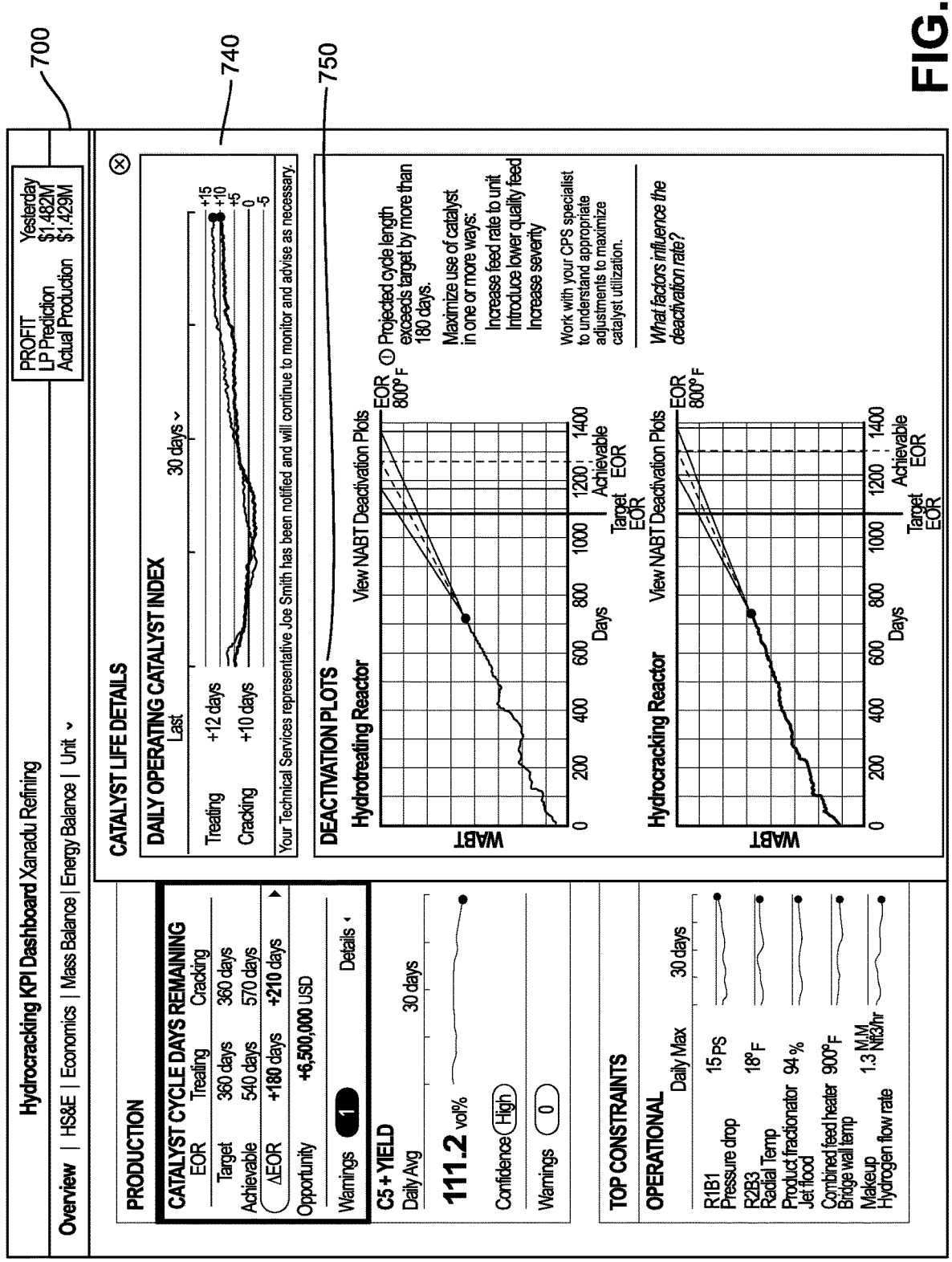

As depicted in FIG. 7D, the dashboard may provide information about catalyst life details 740 (e.g., after a user clicks on a request for "details"). Catalyst life details may include daily operating catalyst index and/or deactivation plots.

Daily operating catalyst index may include information about the current prediction for catalyst (e.g., treating catalyst, cracking catalyst) life. For example, as depicted in FIG. 7D, the treating catalyst is predicted to last for 12 days longer than expected, while the cracking catalyst is predicted to last for 10 days longer than expected.

Deactivation plots 750 may include one or more plots that show the WABT v. days for a particular reactor (e.g., hydrotreating reactor, hydrocracking reactor). In a first part of the plot, a historical actual WABT level may be plotted for a particular day. A plot may include an indication (e.g., a dot) of a present day. A predicted WABT level may be depicted on the plot, as well as a predicted range that the WABT level may spread over until the end-of-run time for the relevant equipment or plant. The predicted range may be smaller for predictions closer to the present, while the predicted range may be greater for predictions further from the present. A plot may include an original target end-of-run date, and/or an achievable end-of-run date based on current predictions for catalyst health.

The dashboard may provide information about whether the projected cycle length exceeds the target cycle length, as well as information about a number of days that the projected cycle length deviates (e.g., above or below) the target cycle length. For example, as depicted in FIG. 7D, the projected cycle length exceeds target by more than 180 days.

The dashboard may provide information (e.g., recommendations) about how to maximize catalyst. For example, information and/or recommendations may include increasing feed rate to unit, introducing lower quality feed, and/or increasing severity. One or more recommendations may be selectable, which in some embodiments may trigger a pop-up window that provides additional information about the recommendation.

Figure 7E:
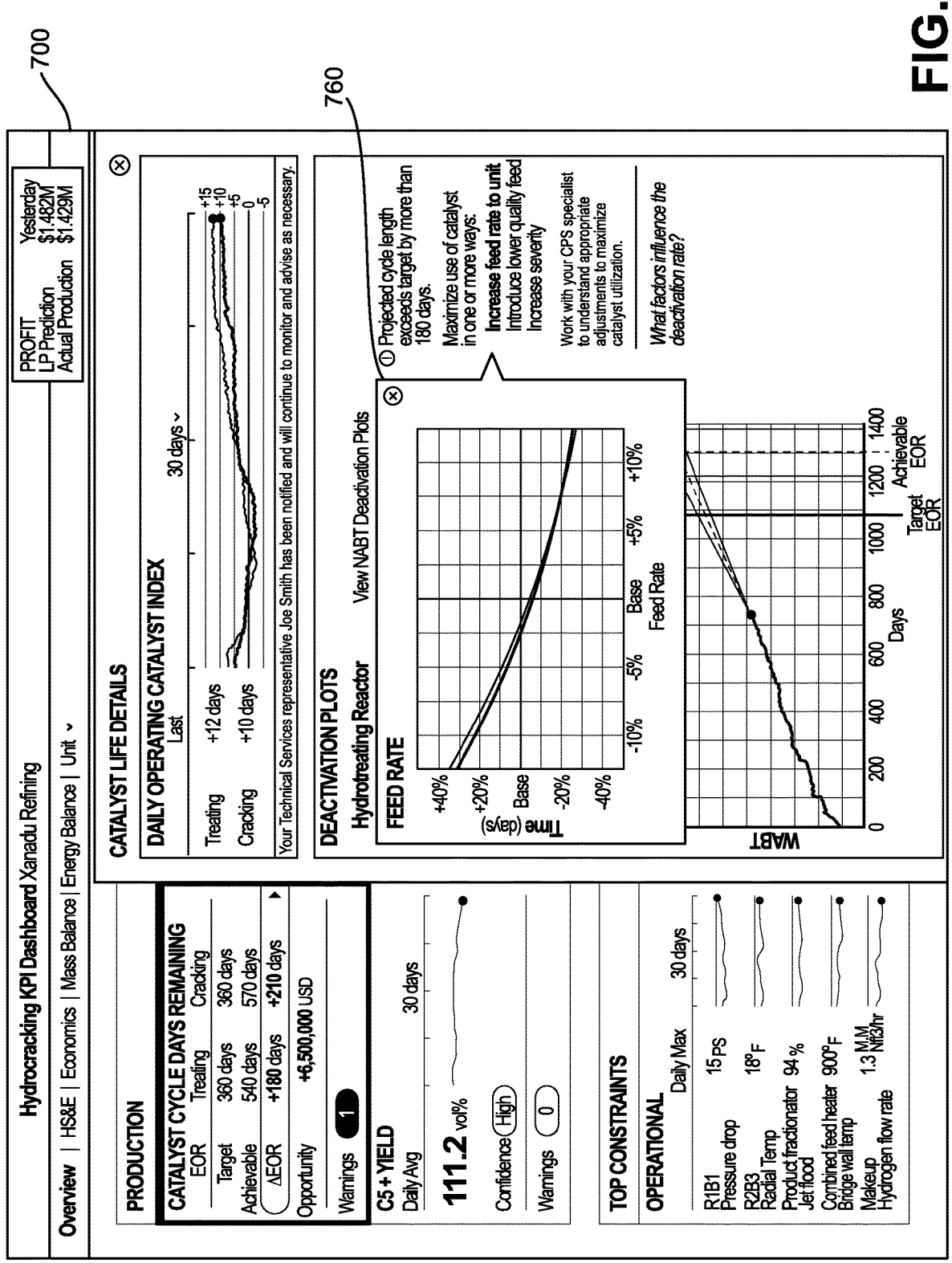

For example, as depicted in FIG. 7E, a pop-up window 760 for a recommendation to increase feed rate to unit may include a chart of time v. base feed rate. Specifically, the chart may show how the cycle length may increase or decrease based on adjustments to the feed rate. For example, as depicted in the chart, if the feed rate is decreased, the time may increase, while if the feed rate is increased, the time may decrease. The chart may include a line for the treating catalyst and/or a line for the cracking catalyst.

Figure 7F:
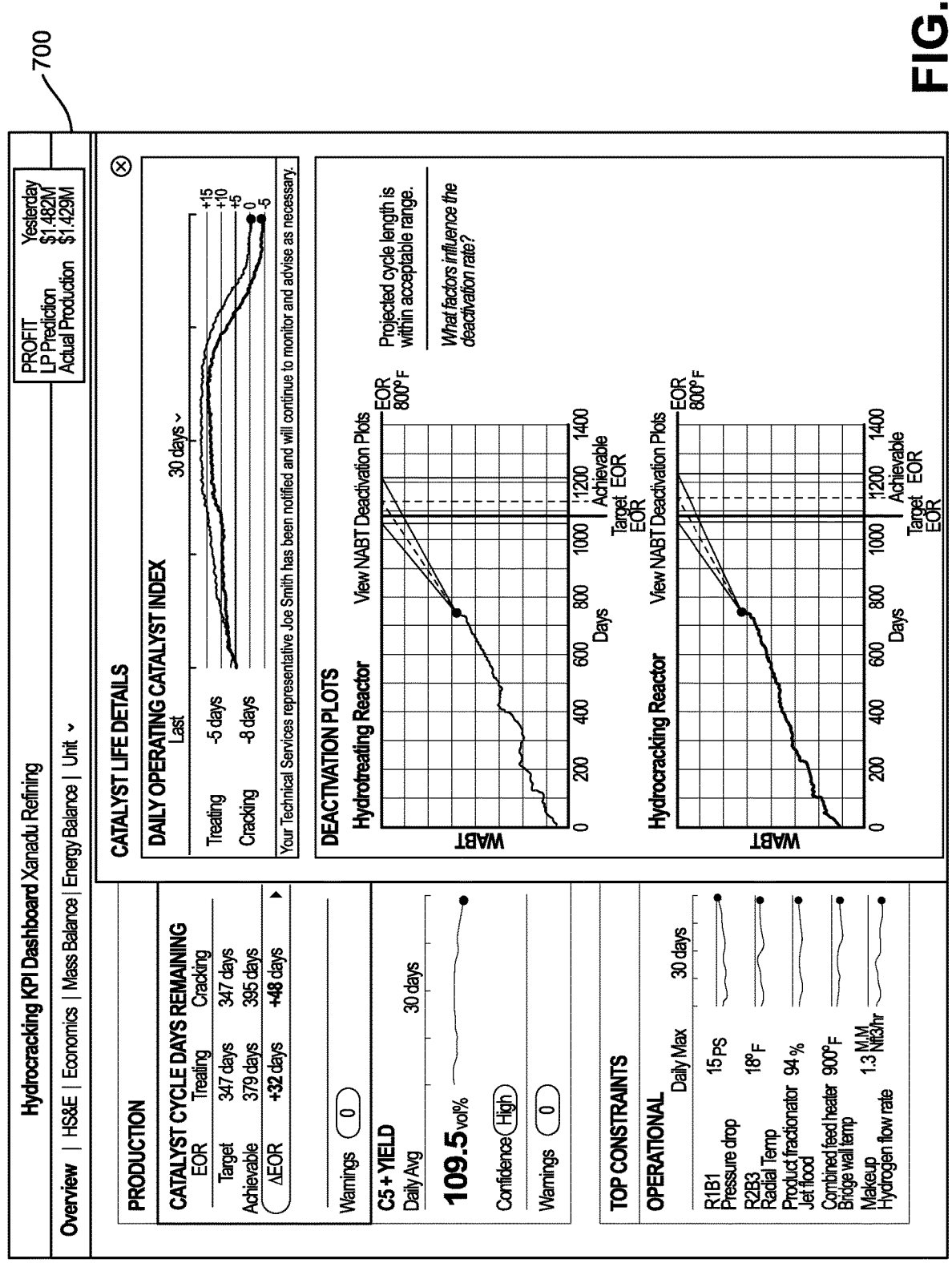

FIG. 7F depicts another example, where the predicted catalyst cycle days remaining no longer triggers a warning (e.g., because the difference of predicted catalyst cycle days remaining vs. target number of catalyst cycle days is less than a threshold).

As depicted in FIG. 7F, in some embodiments, the dashboard might not provide recommendations for increasing or decreasing the cycle length (e.g., because the projected cycle length is within acceptable range).

The dashboard may include a button or option that allows a user to send data to one or more other devices. For example, the user may be able to send data via email, SMS, MMS, text message, IMESSAGE, FTP, cloud sharing, AIRDROP, an in-app message, an in-app alert, or some other method. The user may be able to select one or more pieces of data, graphics, charts, graphs, elements of the display, or the like to share or send.

The data collected by this system may provide a historical information of events, operations, and/or data. This information may be modelled to predict and/or anticipate future issues. This may be used to call for proactive maintenance actions and/or make corrective actions to the operation of the process unit to have an uninterrupted service, to improve efficiency, and/or to improve profit.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps illustrated in the illustrative figures may be performed in other than the recited order, and one or more depicted steps may be optional in accordance with aspects of the disclosure.

What is claimed is:

1. An apparatus comprising:
a plant comprising:
a reactor;
a compressor;
a separator; and
a catalyst bed;
one or more sensors configured to measure operating information for the plant;
a data collection platform comprising:
one or more processors of the data collection platform;
a communication interface of the data collection platform and in communication with the one or more sensors; and
non-transitory computer-readable memory storing executable instructions that, when executed, cause the data collection platform to:
receive sensor data comprising the operating information for the plant;
correlate the sensor data with time data; and
transmit the sensor data;
a data analysis platform comprising:
one or more processors of the data analysis platform;
non-transitory computer-readable memory storing executable instructions that, when executed, cause the data analysis platform to:
receive the sensor data from the data collection platform;
analyze the sensor data to determine an amount of reactant conversion taking place in the reactor of the plant;
based on the amount of the reactant conversion taking place in the reactor, determine an estimated catalyst life for catalyst being used in the reactor;
determine an adjustment to an operating parameter of the plant based on the estimated catalyst life for the catalyst being used in the reactor; and
transmit a command configured to cause the adjustment to the operating parameter of the plant; and
a control platform comprising:
one or more processors of the control platform;
non-transitory computer-readable memory storing executable instructions that, when executed, cause the control platform to:
receive the command for the adjustment to the operating parameter of the plant; and
adjust the operating parameter of the plant.

2. The apparatus of claim 1, wherein the executable instructions of the data analysis platform, when executed, cause the data analysis platform to:
determine the amount of reactant conversion taking place in the reactor based on a type of feedstock and an amount of the feedstock.

3. The apparatus of claim 1, wherein the executable instructions of the data analysis platform, when executed, cause the data analysis platform to:
determine the amount of reactant conversion taking place in the reactor based on an amount of time a feed is in a presence of the catalyst.

4. The apparatus of claim 1, wherein the executable instructions of the data analysis platform, when executed, cause the data analysis platform to:
determine the amount of reactant conversion taking place in the reactor based on a partial pressure of hydrogen in the catalyst bed.

5. The apparatus of claim 1, wherein the executable instructions of the data analysis platform, when executed, cause the data analysis platform to:
determine the amount of reactant conversion taking place in the reactor based on a temperature of the catalyst and a temperature of a reactant.

6. The apparatus of claim 5, wherein the executable instructions of the data analysis platform, when executed, cause the data analysis platform to:
determine an increase in the amount of reactant conversion taking place in the reactor based on an increase in the temperature of the catalyst and an increase in a rate of a reaction.

7. The apparatus of claim 1, wherein the executable instructions of the data analysis platform, when executed, cause the data analysis platform to:
determine an adjustment to a feed rate, a reactor outlet pressure of the reactor, a recycle gas purity, or a normalized average bed temperature of the catalyst bed based on the estimated catalyst life for the catalyst being used in the reactor.

8. The apparatus of claim 1, wherein the executable instructions of the data analysis platform, when executed, cause the data analysis platform to:
use fresh feed information, conversion information, or feed nitrogen information to filter outliers and noise in the sensor data.

9. The apparatus of claim 1, wherein the executable instructions of the data analysis platform, when executed, cause the data analysis platform to:
determine a normalized average catalytic bed for the reactor.

10. The apparatus of claim 9, wherein the executable instructions of the data analysis platform, when executed, cause the data analysis platform to:
detect a break in a linear trend of the normalized average catalytic bed over a catalyst life cycle of the catalyst.

11. The apparatus of claim 9, wherein the executable instructions of the data analysis platform, when executed, cause the data analysis platform to:
determine Eigen values for the normalized average catalytic bed and corresponding days within a window of time.

12. The apparatus of claim 11, wherein the executable instructions of the data analysis platform, when executed, cause the data analysis platform to:
use the Eigen values to determine a case break point; and
after determining that the case break point has been reached, discard old data and use new sensor data to compute new Eigen values.

13. The apparatus of claim 11, wherein the executable instructions of the data analysis platform, when executed, cause the data analysis platform to:
based on using the Eigen values to determine that data for the catalyst bed is linear, fit a linear regression line to the data for the catalyst bed; and
project the fitted linear regression line onto a designed maximum normalized average catalytic bed.

14. The apparatus of claim 13, wherein the executable instructions of the data analysis platform, when executed, cause the data analysis platform to:
determine the estimated catalyst life for the catalyst based on an intersection point of the projected fitted linear regression line and the designed maximum normalized average catalytic bed.

15. The apparatus of claim 1, wherein the executable instructions of the data analysis platform, when executed, cause the data analysis platform to:
  determine the estimated catalyst life for the catalyst bed based on an intersection point of a first Eigen vector with a designed maximum normalized bed temperature vector of the catalyst bed.

16. The apparatus of claim 1, wherein the executable instructions of the data analysis platform, when executed, cause the data analysis platform to:
  provide, to a dashboard, the estimated catalyst life for the catalyst being used in the reactor;
  provide, to the dashboard, an indication of a confidence level for the estimated catalyst life for the catalyst being used in the reactor; and
  provide, to the dashboard, a recommended adjustment to the operating parameter of the plant based on the estimated catalyst life for the catalyst being used in the reactor.

17. Non-transitory computer-readable media storing executable instructions that, when executed by at least one processor, cause a system to:
  receive sensor data for a plant comprising a reactor, a compressor, a separator, and a catalyst bed, the sensor data collected by one or more sensors configured to measure operating information for the plant;
  analyze the sensor data to determine an amount of reactant conversion taking place in the reactor of the plant;
  based on the amount of the reactant conversion taking place in the reactor, determine an estimated catalyst life for catalyst being used in the reactor;
  determine an adjustment to an operating parameter of the plant based on the estimated catalyst life for the catalyst being used in the reactor; and
  transmit a command configured to cause the adjustment to the operating parameter of the plant.

18. The non-transitory computer-readable media of claim 17, wherein the executable instructions, when executed, cause the system to:
  determine an adjustment to a feed rate, a reactor outlet pressure of the reactor, a recycle gas purity, or a normalized average bed temperature of the catalyst bed based on the estimated catalyst life for the catalyst being used in the reactor.

19. A method comprising:
  receiving, by a computing device, sensor data for a plant comprising a reactor, a compressor, a separator, and a catalyst bed, the sensor data collected by one or more sensors configured to measure operating information for the plant;
  analyzing, by the computing device, the sensor data to determine an amount of reactant conversion taking place in the reactor of the plant;
  based on the amount of the reactant conversion taking place in the reactor, determining, by the computing device, an estimated catalyst life for catalyst being used in the reactor;
  determining, by the computing device, an adjustment to an operating parameter of the plant based on the estimated catalyst life for the catalyst being used in the reactor; and
  transmitting, by the computing device, a command configured to cause the adjustment to the operating parameter of the plant.

20. The method of claim 19, comprising:
  determining, by the computing device, an adjustment to a feed rate, a reactor outlet pressure of the reactor, a recycle gas purity, or a normalized average bed temperature of the catalyst bed based on the estimated catalyst life for the catalyst being used in the reactor.

* * * * *